United States Patent
Abe et al.

(10) Patent No.: US 10,999,508 B2
(45) Date of Patent: May 4, 2021

(54) ACTUATOR AND CAMERA MODULE

(71) Applicant: ROHM CO., LTD., Kyoto (JP)

(72) Inventors: Shinichi Abe, Kyoto (JP); Akihito Saito, Kyoto (JP); Yoshihiro Sekimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 26 days.

(21) Appl. No.: 16/444,457

(22) Filed: Jun. 18, 2019

(65) Prior Publication Data
US 2019/0394399 A1 Dec. 26, 2019

(30) Foreign Application Priority Data

Jun. 21, 2018 (JP) .............................. JP2018-117990

(51) Int. Cl.
*H04N 5/232* (2006.01)
*G02B 7/09* (2021.01)
(Continued)

(52) U.S. Cl.
CPC ......... *H04N 5/23287* (2013.01); *G02B 7/022* (2013.01); *G02B 7/09* (2013.01);
(Continued)

(58) Field of Classification Search
CPC .... H04N 5/217; H04N 5/2328; H04N 5/2251; H04N 5/2254; H04N 5/2257;
(Continued)

(56) References Cited

U.S. PATENT DOCUMENTS 7,881,598 B1 * 2/2011 Wu .......................... G03B 3/10
396/55
9,372,352 B2 6/2016 Lim et al.
(Continued)

FOREIGN PATENT DOCUMENTS

CN 203745708 U 7/2014
CN 104423118 A 3/2015
(Continued)

OTHER PUBLICATIONS

CNIPA Office Action for corresponding CN Application No. 201910522064.0; Dated: Dec. 21, 2020 (brief English summary included).

*Primary Examiner* — Lin Ye
*Assistant Examiner* — Chriss S Yoder, III
(74) *Attorney, Agent, or Firm* — Cantor Colburn LLP

(57) ABSTRACT

The present invention reduces magnetic fog noise of an actuator.
An actuator is used jointly with a position detection element to locate a lens in a direction of a first axis. A coil is formed in a manner of setting a second axis perpendicular to the first axis as a length direction, and has a first side and a second side parallel to the second axis, and a third side and a fourth side parallel to the first axis. A permanent magnet produces magnetic fields perpendicular to the first axis and the second axis and being in opposite directions with respect to the first side and the second side, respectively. During use, the position detection element is configured near the third side. The coil is split into multiple parts in a width direction on at least the third side.

21 Claims, 23 Drawing Sheets

(51) Int. Cl.
 *G02B 7/02* (2021.01)
 *H04N 5/225* (2006.01)
 *G03B 13/36* (2021.01)
 *H04N 5/217* (2011.01)

(52) U.S. Cl.
 CPC ............ *G03B 13/36* (2013.01); *H04N 5/217*
 (2013.01); *H04N 5/2257* (2013.01); ***H04N
 5/23258*** (2013.01); *G03B 2205/0053* (2013.01)

(58) Field of Classification Search
 CPC .. H04N 5/23258; H04N 5/23287; G03B 5/00;
  G03B 5/02; G03B 13/36; G03B
  2205/0015; G03B 2205/0053; G03B
  2205/0069; G02B 7/022; G02B 7/09;
  G02B 7/28; G02B 27/646
 See application file for complete search history.

(56) References Cited

U.S. PATENT DOCUMENTS

| 10,444,531 | B2 | 10/2019 | Ichihashi |
| 2011/0217029 | A1* | 9/2011 | Wu ........................ G03B 17/00 |
| | | | 396/55 |
| 2013/0016427 | A1* | 1/2013 | Sugawara .............. G03B 13/36 |
| | | | 359/557 |
| 2016/0085086 | A1 | 3/2016 | Rho et al. |
| 2016/0306134 | A1* | 10/2016 | Hayashi ................... G02B 7/09 |

FOREIGN PATENT DOCUMENTS

| CN | 108020901 A | 5/2018 |
| JP | 2013024938 A | 2/2013 |
| JP | 2013033179 A | 2/2013 |
| JP | 2017090887 A | 5/2017 |

\* cited by examiner

ACTUATOR AND CAMERA MODULE

CROSS REFERENCE TO RELATED APPLICATION

The present application claims priority under 35 U.S.C. § 119 to Japanese Application No. 2018-117990 filed Jun. 21, 2018, the entire content of which is incorporated herein by reference.

FIELD OF THE INVENTION

The present invention relates to an actuator using a magnetic position detection device.

BACKGROUND

Many electronic devices such as smartphones, tablet computers and personal computers are equipped with a camera function, which is provided by a module, referred to a camera module integrating a camera element or lens and an automatic focusing mechanism.

To achieve automatic focusing or optical image stabilization (OIS), a camera module includes an actuator for locating the lens (or a lens group).

FIG. 1 shows a block diagram of a fundamental structure of an actuator 100. The actuator 100 is a voice coil motor (VCM), and includes a coil 101 and a permanent magnet 110. The actuator 100 generates a force in an X-axis direction. The coil 101 is long in size in the Y-axis perpendicular to the X-axis. The permanent magnet 110 produces magnetic flux densities B in opposite directions with respect to two sides S1 and S2 of the coil 101 extending along the Y-direction. From a perspective of one winding included in the side S1, a current I flows in a positive direction towards the Y-axis and acts with the magnetic flux density B in a positive direction of the Z-axis, and thus a Lorentz force in a positive direction of the X-axis is produced between the winding and the permanent magnet 110.

$$F=BIL$$

In a situation where the permanent magnet 110 is fixed and the coil 101 is a movable coil type, the coil 101 moves in the direction of the X-axis. L is the length of the sides S1 and S2 in the Y-direction. From a perspective of the side S2, the current I flows towards a negative direction of the Y-axis and acts with the magnetic flux density B in a negative direction of the Z-axis, and hence F=BIL with respect to each winding is produced.

In the recent years, among camera modules provided in smartphones, the number of camera modules, which are introduced with a function of controlling at a high speed with high precision a position of a camera lens by detecting a position (displacement) of the camera lens and feeding back the position information, is constantly increasing. Particularly, by introducing feedback control for use of OIS, high precision image stabilization (or hand jitter correction) can be achieved. Thus, along increasing requirements on capturing without jittering a remote object under capturing in a darker environment, the number of cameras adopting OIS shall also continue to increase.

Further, in an automatic focusing (AF) function, feedback control is also introduced. As a result, the number of camera modules aiming at high-speed focusing and capturing or high-precision focal position maintenance also continues to increase.

To use such feedback control, the position (displacement) of a camera lens needs to be detected as described above. In most circumstances, camera modules adopt magnetic position detection devices, for the reasons such as: if an optical position detection device is used, there is a potential risk of forming ghost imaging due to leakage light entering a camera component; in addition, when the VCM in FIG. 1 is used as an actuator driving a camera lens, the permanent magnet 110 for the purpose of driving herein can also be used as a part of a magnetic position detection device.

When a VCM drive magnet is used as a position detection device, a condition of the presence of a drive coil provided opposite to the magnet needs to be taken into account. Assume that a position detection element such as a Hall element also needs to be configured opposite to a magnet, and a drive coil and the position detection element are configured close to each other. As generally known, a magnetic field is produced when a current is applied to a coil, and a magnetic flux produced by the magnetic field then enters the position detection element. As such, when a magnetic flux produced by a coil enters a position detection device, even if a camera lens is not moved, the position detection element nonetheless outputs a change in a position detection signal according to a change in the current. In the application, the above situation is referred to as magnetic fog noise. Such magnetic fog noise becomes noise in regard to the original position detection signal, leading to a concern in deterioration in the position control precision of the camera lens. In an ideal situation, a position detection element is configured, for example, at a position having extremely small magnetic fog noise.

Multiple configuration examples have been disclosed in regard to a position relationship between a drive coil used as a drive magnet and a position detection element configured opposite to each other. For example, patent document 1 discloses an example of configuring a position detection element on an inner side or an outer side of a drive coil winding. Further, patent document 2 discloses that two drive coils are configured side-by-side, with a position detection element configured therebetween.

FIG. 2A to FIG. 2C are brief diagrams of position relationships of drive coils and position detection elements (Hall elements) disclosed in patent documents 1 and 2.

As disclosed in patent document 1, FIG. 2A depicts an example of configuring a Hall element 102 on an inner side of a winding of a coil 101. In patent document 1, the Hall element is configured at a center of the coil winding, and FIG. 2A depicts an example of configuring the Hall element 102 near an inner edge of the coil 101 where a maximum magnetic flux density of the coil 101 occurs due to an edge effect.

As disclosed in patent document 1, FIG. 2B depicts an example of configuring the Hall element 102 on an outer side of the winding of the coil 101.

As disclosed in patent document 2, FIG. 2C depicts an example of configuring the Hall element 102, at a middle position of two coils 101 arranged side-by-side, at a position slightly deviated along a thickness direction of the coil.

BACKGROUND TECHNICAL DOCUMENTS

[Patent document 1] JP Patent Publication Laid-Open No. 2017-09887

[Patent document 2] JP Patent Publication Laid-Open No. 2013-24938

SUMMARY OF THE INVENTION

The Applicants conducted researches on the position relationship between a drive coil and a position detection element, and has recognized the following issues.

FIG. 3 shows a contour plot of distribution of sizes of magnetic flux densities of one single coil, and depicts sizes of components of magnetic flux densities in the coil thickness direction near an inner edge and an outer edge of a coil 101. At this point, the magnetic flux density when the number of turns of the coil 101 is set to 100 turns and a 1 A current is applied is calculated, and the numerals of the contour lines represent the magnetic flux density in a unit of millitesla (mT). Further, a dotted line means that a magnetic flux direction thereof is vertically opposite to that a solid line. In the diagram, the point P10 is assumed to be the position of a detection portion of a Hall element in FIG. 2A, and the point P20 is assumed to be the position of a detection portion of the Hall element in FIG. 2B.

It is seen from the diagram that, if a Hall element is configured at the position of P10 or P20, the magnetic flux density at the position of the Hall element becomes quite large, such that larger magnetic fog noise may be leaked to the Hall element. When a Hall element is configured at a position where the coils have a substantially same thickness, the Hall element needs to be configured, with thorough separation from the coil, at an outer side of the coil winding. When a Hall element is to be configured near an outer edge of a coil, the Hall element needs to be configured in a separated manner in a thickness direction of the coil. On an inner side of a winding coil, the magnetic flux density near the inner edge is still in a larger value although it is already less compared to that near the center of the winding. Thus, ideally, configuring a Hall element on an inner side of a winding should be avoided. As previously described, the issues are that, there are numerous positions at which a Hall element should not be configured, rendering a smaller degree of configuration freedom.

FIG. 4 shows a contour plot of distribution of sizes of magnetic flux densities of two coils, and depicts sizes of components of the magnetic flux densities in the coil thickness direction and near a middle position of the two coils 101. At this point, the magnetic flux density when the number of turns of the coils 101 is set to 100 turns and a 1 A current is applied is calculated, and the numerals of the contour lines represent the magnetic flux density in a unit of millitesla (mT). Further, a dotted line means that magnetic flux direction thereof is vertically opposite to that of a solid line. In the diagram, the point P30 is assumed to be the middle position of the two coils 101, and the point P40 is assumed to be the position of a detection portion of the Hall element in FIG. 2C.

It is seen from the diagram that, the magnetic flux density is substantially zero at the position of P40, and thus the issue of magnetic fog noise is not at all generated. However, at the position of P30, the magnetic flux density at the position of the Hall element becomes quite large, such that larger magnetic fog noise is leaked to the Hall element. Due to limitations in the thickness in an application as a camera module, the above magnetic fog noise becomes an issue if it is necessary to configure a Hall element at the position of P30. As described above, the issues are that, the range in which a position of a Hall element should not be configured is quite large, rendering a smaller degree of configuration freedom.

The present invention is accomplished in view of the above issues, and an object of an exemplary embodiment of the present invention is to provide an actuator capable of reducing magnetic fog noise.

An embodiment of the present invention relates to an actuator, which is used jointly with a position detection element to locate a lens in a direction of a first axis. The actuator includes: a coil, formed in a manner of setting a second axis perpendicular to the first axis as a length direction, having a first side and a second side parallel to the second axis and a third side and a fourth side parallel to the first axis; and a permanent magnet, producing magnetic fields perpendicular to the first axis and the second axis and in opposite directions with respect to the first side and the second side. During use, the position detection element is configured near the third side, and the coil is split into multiple parts in a width direction at least on the third side.

An embodiment of the present invention relates to a camera module. The camera module is characterized in including: a camera lens, capable of being support by means of moving towards a predetermined direction; a coil and a permanent magnet, for driving the camera lens; and a position detection element, for magnetically detecting a position of the camera lens; wherein, the coil is formed as a dual structure of two coils including an inner coil and an outer coil.

According to the embodiment, a position at which a magnetic field produced by the inner coil and a magnetic field produced by the outer coil are mutually counteracted is present, so as to create a position suitable for configuring the position detection element.

Further, the coil can be configured near the position detection element. Observing from a winding axial direction of the coil, a center of a magnetic detection portion of the position detection element is between a middle position of an inner edge and an outer edge of the inner coil and a middle position of an inner edge and an outer edge of the outer coil.

Thus, the position detection element can be configured in a region where a direction of the magnetic field produced by the inner coil is opposite to a direction of the magnetic field produced by the outer coil, thereby reducing magnetic fog noise caused by magnetic flux produced by applying electricity to a coil and entering a position detection element.

Further, a turn ratio of the inner coil to the outer coil can be correspondingly determined according to the position of the position detection element.

Thus, on the position of the position detection element, the direction of the magnetic field produced by the inner coil can be opposite to that of the magnetic field produced by the outer coil, and the sizes of the magnetic fields can be the same, thereby reducing the magnetic fog noise caused by magnetic flux produced by applying electricity to a coil and entering a position detection element.

Further, the number of turns of the outer coil can be decreased compared to that of the inner coil.

Thus, a region in which the magnetic field produced by the inner coil and the magnetic field produced by the outer coil are mutually counteracted can be shifted closer to an outer edge, thereby more easily preventing the coil from interfering the position detection element when the position detection element is configured on a preferred position capable of reducing magnetic fog noise.

Further, the inner coil and the outer coil are connected in parallel, and a ratio of a current value to be supplied to the inner coil to a current value to be supplied to the outer coil is correspondingly determined according to the position of the position detection element.

Thus, on the position of the position detection element, the direction of the magnetic field produced by the inner coil can be opposite to that of the magnetic field produced by the outer coil, and the sizes of the magnetic fields can be the same, thereby reducing the magnetic fog noise caused by magnetic flux produced by applying electricity to a coil and entering a position detection element.

Further, a current value to be supplied to the outer coil can be decreased compared to a current value to be provided to the inner coil.

Thus, on the position of the position detection element, the direction of the magnetic field produced by the inner coil can be opposite to that of the magnetic field produced by the outer coil, and the sizes of the magnetic fields can be the same, thereby reducing the magnetic fog noise caused by magnetic flux produced by applying electricity to a coil and entering a position detection element.

Further, the coil can be a patterned coil.

Thus, the two coils, namely the inner coil and the outer coil are formed by means of pre-patterning, and can be easily installed with high precision compared to individually locating and installing the inner coil and the outer coil respectively forming windings.

Further, the coil can be configured opposite to the permanent magnetic, the position detection element can be configured opposite to the permanent magnet, and the permanent magnet serves both purposes of driving and position detection.

Thus, the permanent magnet can serve both purposes of driving and position detection, thereby reducing the number of parts used.

Further, a position detection signal generated by the position detection element can be used to control the position of the camera lens by means of feedback control.

Thus, the position detection signal in a state where the magnetic fog noise is reduced is used for feedback control, and thus position control on the camera lens can be achieved with higher precision.

Further, any implementation forms obtained by exchanging any combinations of the above constituting elements, constituting elements of the present invention, or associated expressions in methods, devices and systems are also valid.

In addition, the description for the method for solving the issues does not describe all essential features, and thus any sub-combinations of these features described can also satisfy the present invention.

A camera modules is provided according to the present invention. The camera module is capable of reducing magnetic fog noise generated after magnetic flux produced by applying electricity to a coil enters a position detection element, thereby achieving position control on a camera lens with higher precision.

DETAILED DESCRIPTION OF THE EMBODIMENTS

Figure 1:
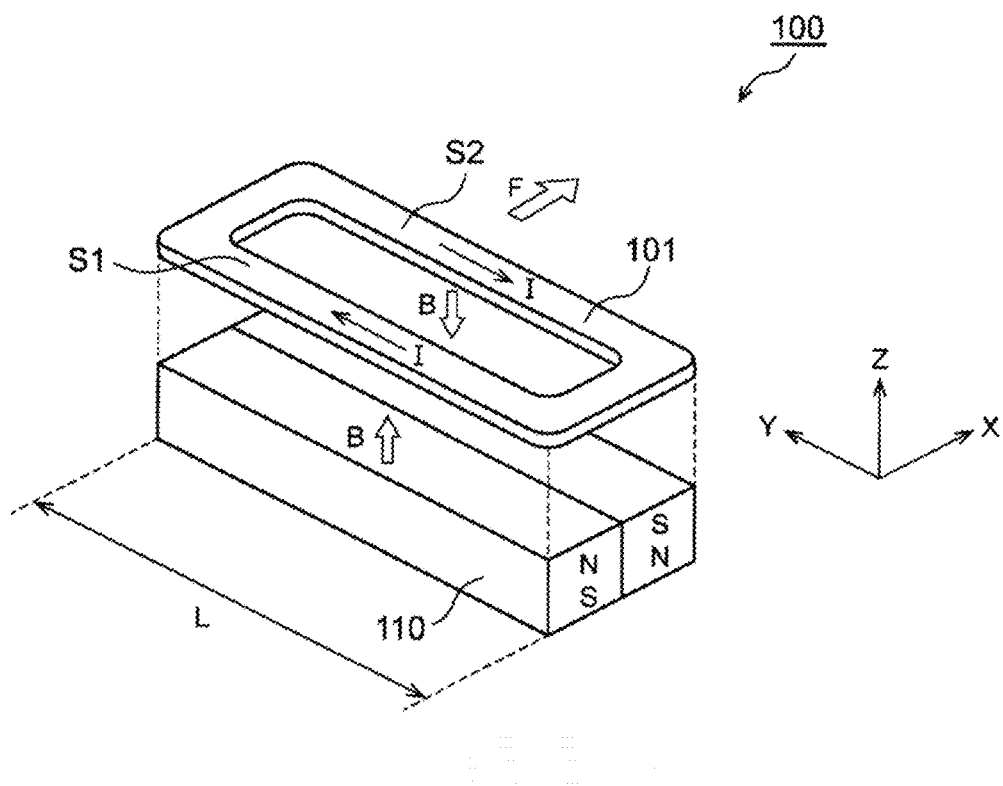
FIG. 1. is a diagram of a fundamental structure of an actuator.
Figure 2A:
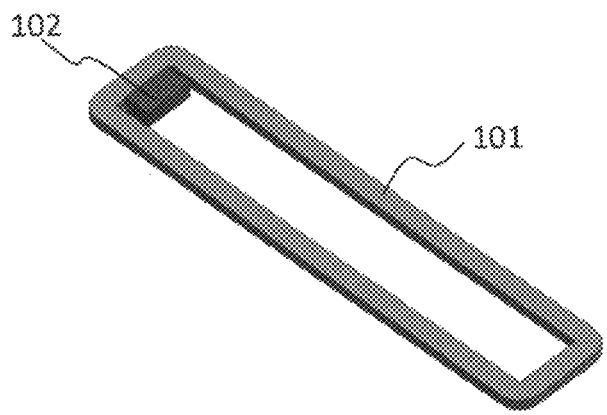
FIG. 2A to FIG. 2C are three-dimensional diagrams for roughly representing a position relationship between a drive coil and a position detection element of the prior art.
Figure 2B:
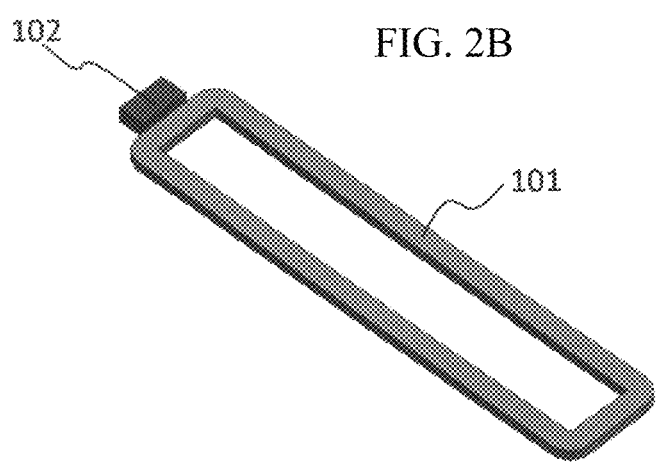
Figure 2C:
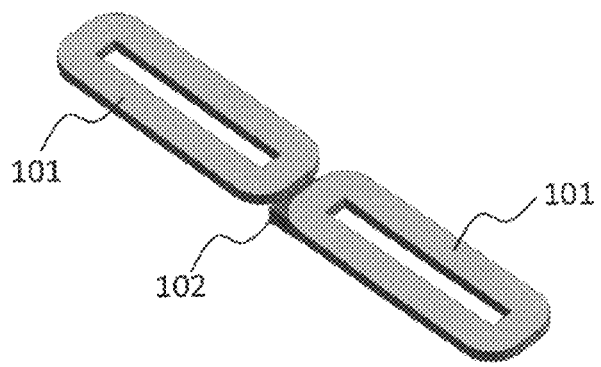
Figure 3:
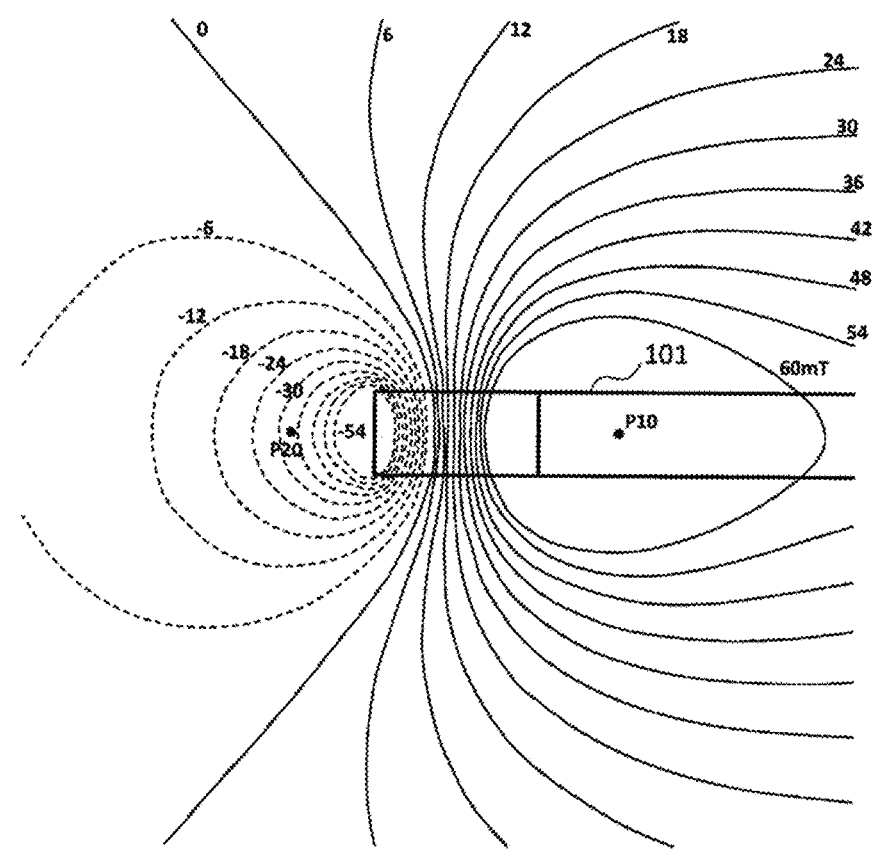
FIG. 3 is a contour plot of distribution of sizes of magnetic flux densities of one single coil.

The present invention is described on the basis of preferred embodiments with the accompanying drawings below. The same or similar constituting elements, components and processes shown in the drawings are represented by the same denotations, and repeated description is appropriately omitted. Further, the embodiments are examples of rather than limitations to the present invention. All features described in the embodiments or combinations thereof are not necessarily essential contents of the present invention.

In the application, an expression "a state of connecting a component A to a component B" further includes, in addition to physically and directly connecting the component A to the component B, a situation of indirectly connecting the component A to the component B by other components, which do not impose a substantial effect on an electrical connection state thereof or do not compromise a function or effect that can be exercised by a combination thereof.

Similarly, an expression "a state of connecting a component C configured between a component A and a component B" further includes, in addition to directly connecting the component A to the component C and the component B to the component C, a situation of indirectly connecting by other components therebetween, which do not impose a substantial effect on an electrical connection state thereof or do not compromise a function or effect that can be exercised by a combination thereof.

<Actuator>

Figure 5:
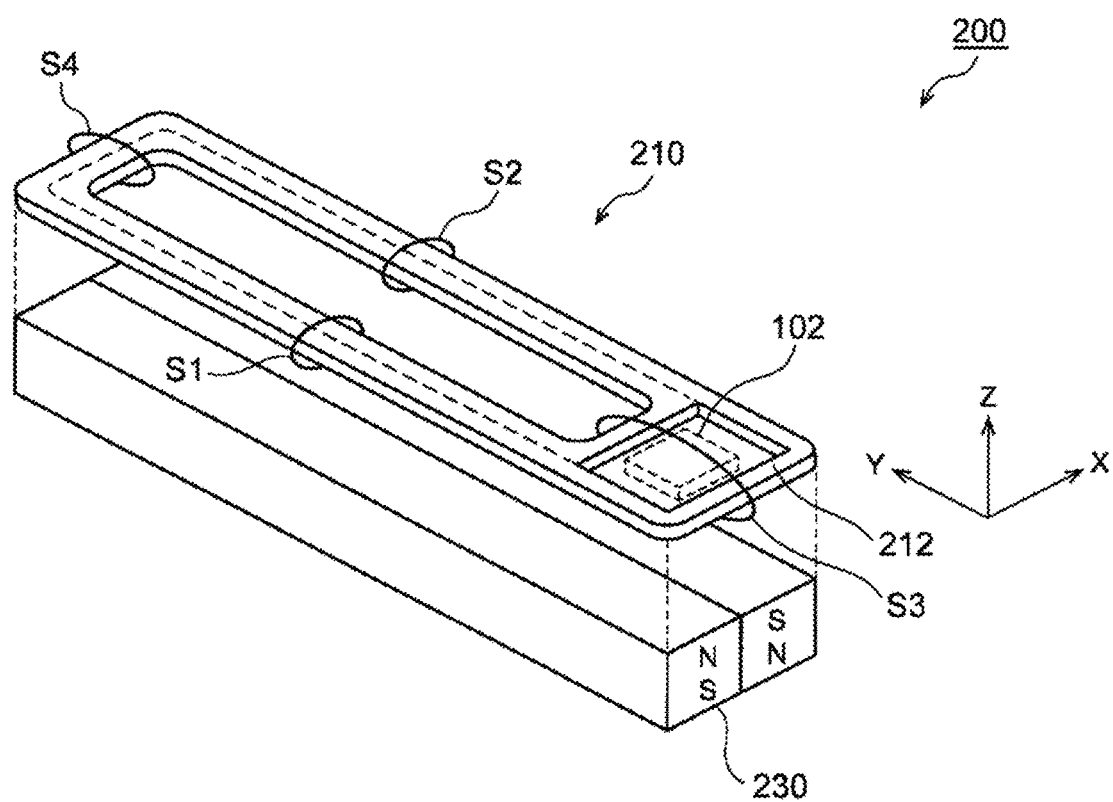
FIG. 5 is a three-dimensional diagram of a fundamental structure of an actuator according to an embodiment.

FIG. 5 shows a diagram of a fundamental structure of an actuator 200 according to an embodiment. The actuator 200 includes a coil 210 and a permanent magnet 230. The actuator 200 is used jointly with a Hall element 102 serving as a position detection element, so as to locate an object (not shown) in a direction of a first axis (the X-axis). Further, the position detection element is not limited to being a Hall element, and a magneto-resistive element can also be used.

The coil 210 is formed in a manner of setting a second axis (the Y-axis) perpendicular to the first axis (the X-axis) as a length direction. The coil 210 has a first side S1 to a fourth side S4, wherein the first side S1 and the second side S2 are parallel to the second axis (the Y-axis), and the third axis S3 and the fourth axis S4 are parallel to the first axis (the X-axis).

The permanent magnet 230 produces magnetic fields perpendicular to the first axis (the X-axis) and the second axis (the Y-axis) and in opposite directions with respect to the first side S1 and the second side S2.

Figure 4:
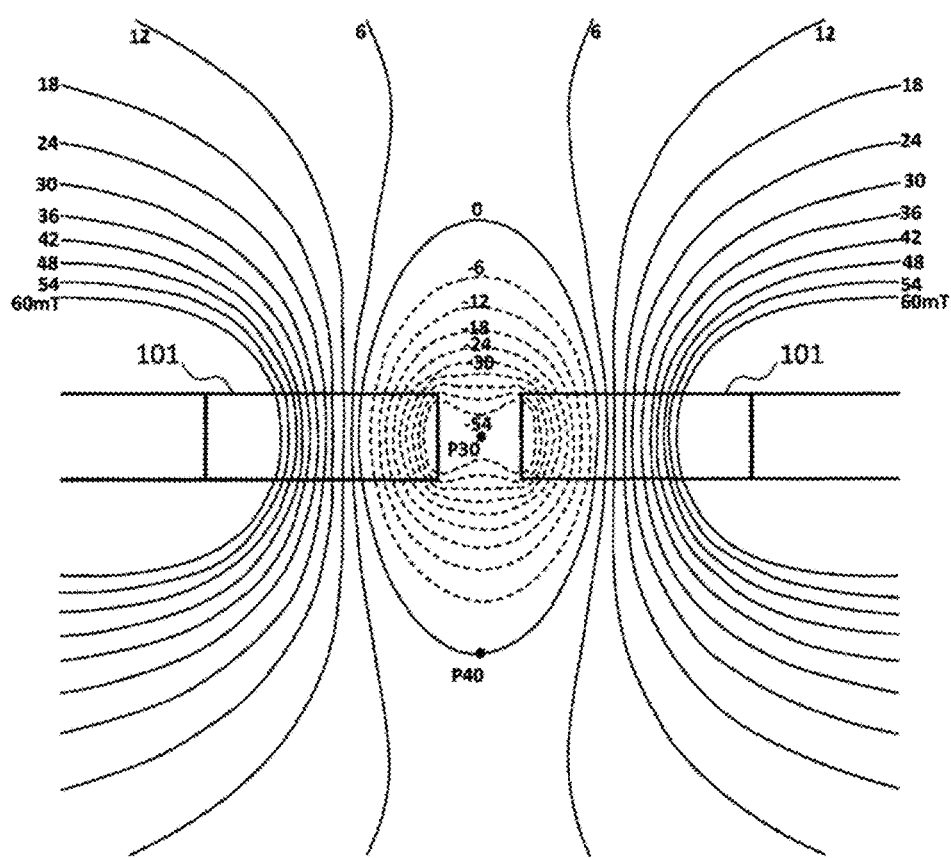
FIG. 4 is a contour plot of distribution of sizes of magnetic flux densities of two coils.

During use, the Hall element 102 is configured near the third side S3. The coil 210 is split into multiple parts in the width direction (i.e., a direction of the Y-axis) at least on the third side S3. In FIG. 4, the third side S3 is split into two parts (to be referred to as a first part 212 and a second part 214).

Figure 6A:
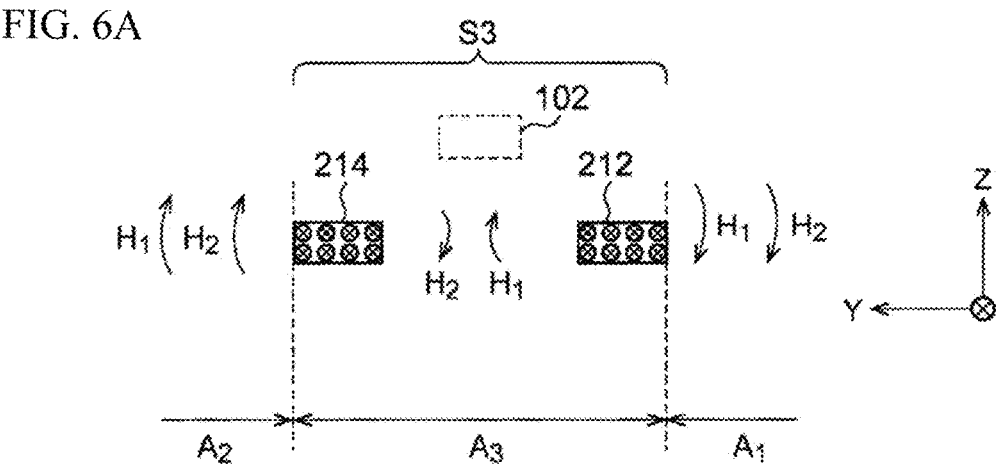
FIG. 6A is a section diagram of a third side of the actuator in FIG. 5.

The above is the fundamental structure of the actuator 200. Operations of the actuator 200 are to be described below. FIG. 6A shows a section diagram of the third side S3 of the actuator 200 in FIG. 5. The coil 210 is a winding coil, and, in the windings respectively included in the first part 212 and the second part 214, a current flows in a direction orthogonal to a paper surface. From the perspective of the Y direction, in a region $A_1$ closer to the outer side than the first part 212, a magnetic field $H_1$ formed by the first part 212 and a magnetic field $H_2$ formed by the second part 214 are mutually reinforced. Further, in a region $A_2$ closer to the inner side than the second part 214, the magnetic field $H_1$ formed by the first part 212 and the magnetic field $H_2$ formed by the second part 214 are also mutually reinforced. Conversely, in a region $A_3$ corresponding to a width W of the third side S3, the magnetic field $H_1$ formed by the first part 212 and the magnetic field $H_2$ formed by the second part 214 are mutually counteracted. Thus, by including the Hall element 102 in the region $A_3$, more specifically, by configuring the Hall element 102 at or near a part where a combined magnetic field is extremely small, the influence of magnetic fog noise can be reduced. The position of the Hall element 102 can be configured given that a combined magnetic field of a part capable of sensing magnetic fields (magnetic detection portion) is reduced.

Figure 6B:
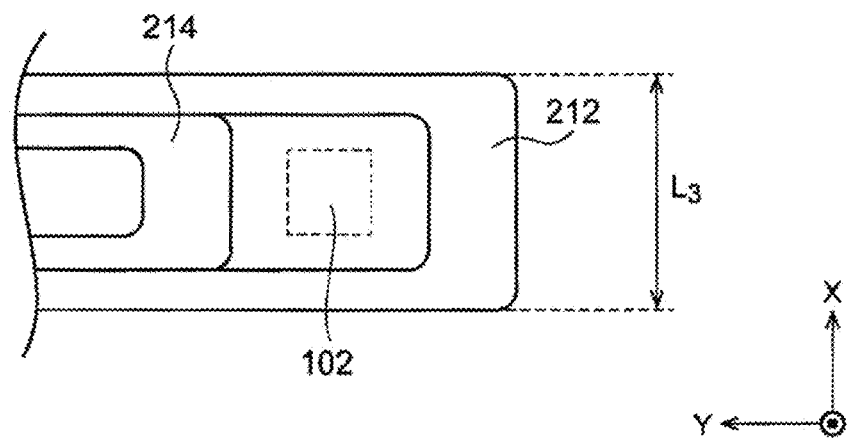
FIG. 6B is a projection diagram of the actuator in FIG. 5.

FIG. 6B shows a projection diagram of the actuator 200. When the constituting elements of the actuator 200 are projected onto a plane (XY-plane) formed by the first axis (the X-axis) and the second axis (the Y-axis), a magnetic detection portion of the Hall element 102 is in a direction of the second axis (the Y-axis) and is located in the region $A_3$ between the first part 212 and the second part 214. Further, in the direction of the first axis (the X-axis), the Hall element 102 can be configured within a range of a length $L_3$ of the third side S3, more preferably, near the center of the length of the third side S3.

Figure 7A:
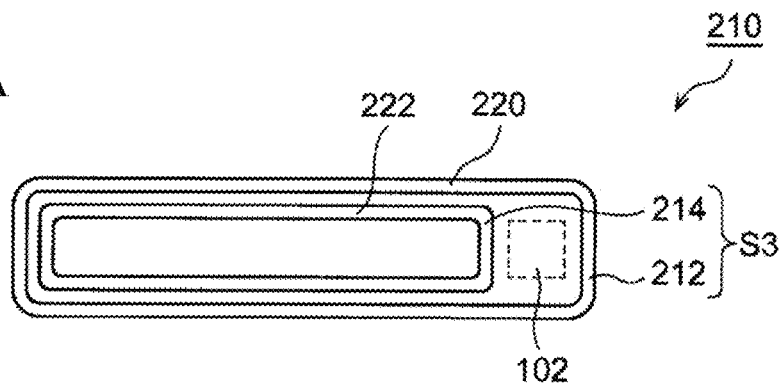
FIG. 7A is a top view of a coil according to a first embodiment variation.
Figure 7B:
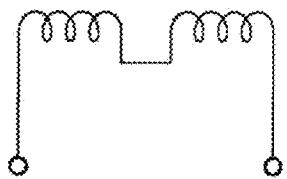
FIG. 7B to FIG. 7D are equivalent circuit diagrams thereof.
Figure 7C:
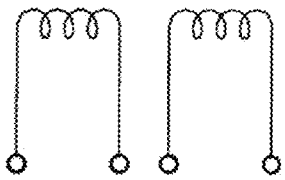

FIG. 7A shows a top view of the coil 210 according to a first embodiment variation, and FIG. 7B to FIG. 7C are equivalent circuit diagrams thereof. All sides among the first side S1 to the fourth side S4 of the coil 210 are split into two parts. That is to say, the coil 210 includes an outer coil 220 and an inner coil 222. The Hall element 102 can also be configured between the part 212 of the outer coil 220 and the part 214 of the inner coil 222 forming the third side S3. As shown in FIG. 7B, the outer coil 220 and the inner coil 222 can also be electrically connected in series. In this case, the current flowing in the outer coil 220 is the same as that in the inner coil 222.

As shown in FIG. 7B, the outer coil 220 and the inner coil 222 can also be electrically connected in series. In this case, a driving current $I_{DRV}$ flowing in the outer coil 220 and in the inner coil 222 is common, and one VCM driver can be used for driving. In this case, the distance of the first part 212 to the second part 214, the position of the Hall element 102, and the numbers (i.e., the turns) of the windings (or coil patterns) respectively included in the first part 212 and the second part 214 can be used as parameters, so as to reduce the combined magnetic field of the Hall element 102.

As shown in FIG. 7C, the coil 210 forms independent driving currents $I_{DRV1}$ and $I_{DRV2}$ that can be individually supplied to the outer coil 220 and the inner coil 222. In this case, two VCM drivers are needed, and the two driving currents $I_{DRV1}$ and $I_{DRV2}$ can be used as parameters, so as to decrease the combined magnetic field of the Hall element 102.

Figure 7D:
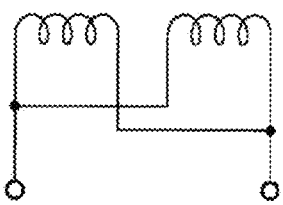

As shown in FIG. 7D, the outer coil 220 and the inner coil 222 can also be electrically connected in parallel.

Figure 8:
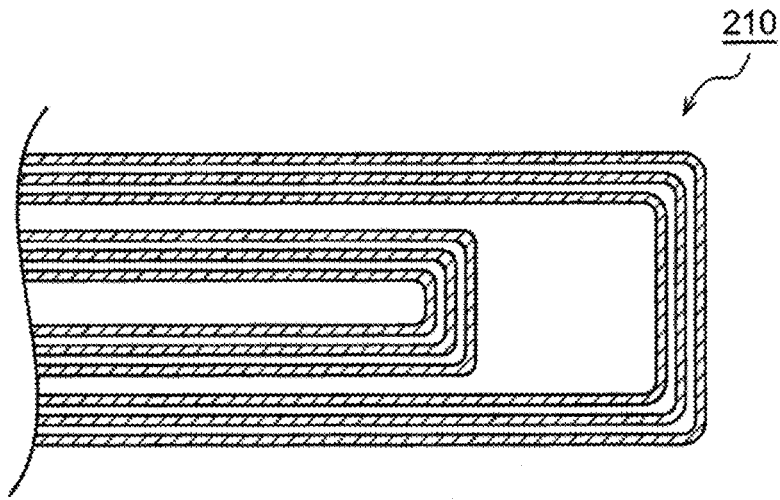
FIG. 8 is a top view of a coil according to a second embodiment variation.

FIG. 8 shows a top view of the coil 210 according to a second embodiment variation. In this embodiment variation, the coil 210 forms a patterned coil. Although FIG. 8 depicts that the coil 210 has one layer, the coil 210 can have multilayer structure.

Figure 9:
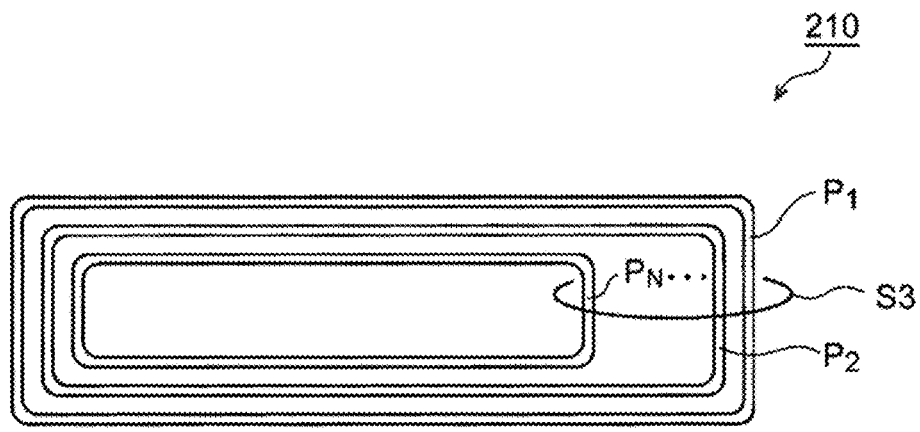
FIG. 9 is a top view of a coil according to a third embodiment variation.

FIG. 9 shows a top view of the coil 210 according to a third embodiment variation. In the description above, the coil 210 is split to two parts on the third side S3, and can also be split into any N parts $P_1$ to $P_N$ (N≥2) more than two or three. In this case, the Hall element 102 an be configured at a part where a combined magnetic field produced by the multiple parts $P_1$ to $P_N$ is zero; alternatively, the position of the Hall element 102 is configured in a way that the combined magnetic field is minimized while spaces between the multiple parts $P_1$ to $P_N$ and the numbers of turns of the parts $P_1$ to $P_N$ are optimized.

Figure 10:
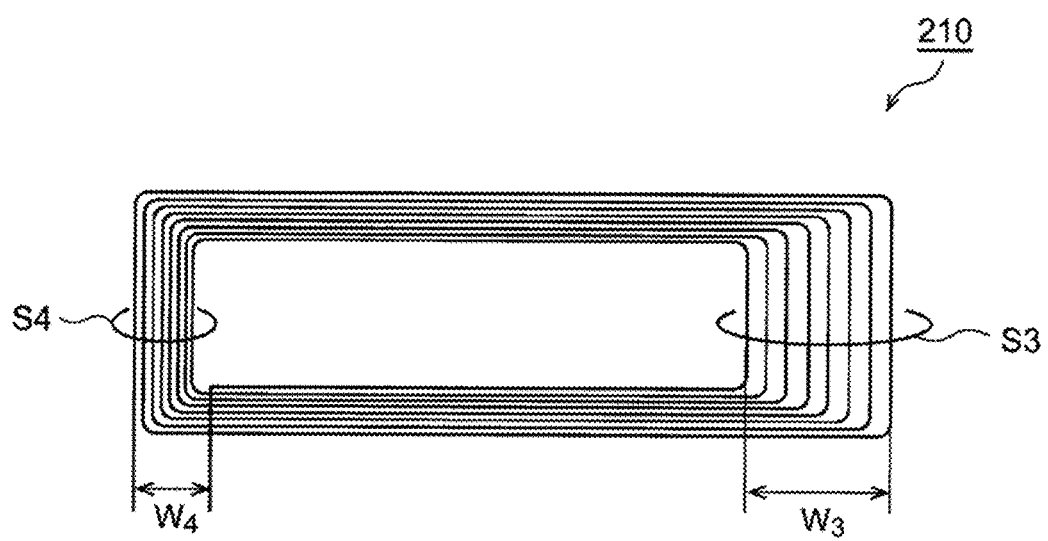
FIG. 10 is a top view of a coil according to a fourth embodiment variation.

FIG. 10 shows a top view of the coil 210 according to a fourth embodiment variation. Observing the coil 210 from another aspect, it can be understood that a width W3 of the third side S3 of the coil 210 is intentionally larger than a width W4 of the fourth side S4 opposite thereto to have a wide breadth, so as to decrease the combined magnetic field (the magnetic flux density) at the Hall element 102 by optimizing the distribution of the winding in the width direction (the Y-direction) on the third side S3. From the above aspect, the coil 210 is not necessarily split into multiple parts on the third side S3, and the density of the winding can also be different on the outer side and on the inner side. Although the embodiment variation can also be installed in a winding coil, it is suitable to a situation where a patterned coil is adopted.

In another embodiment variation, in a situation where the coil 210 is split into multiple coils 220 and 222 as in FIG. 7A, a particular coil is formed in form of a winding coil, and other coils are formed in form of patterned coils.

<Camera Module>

Figure 11:
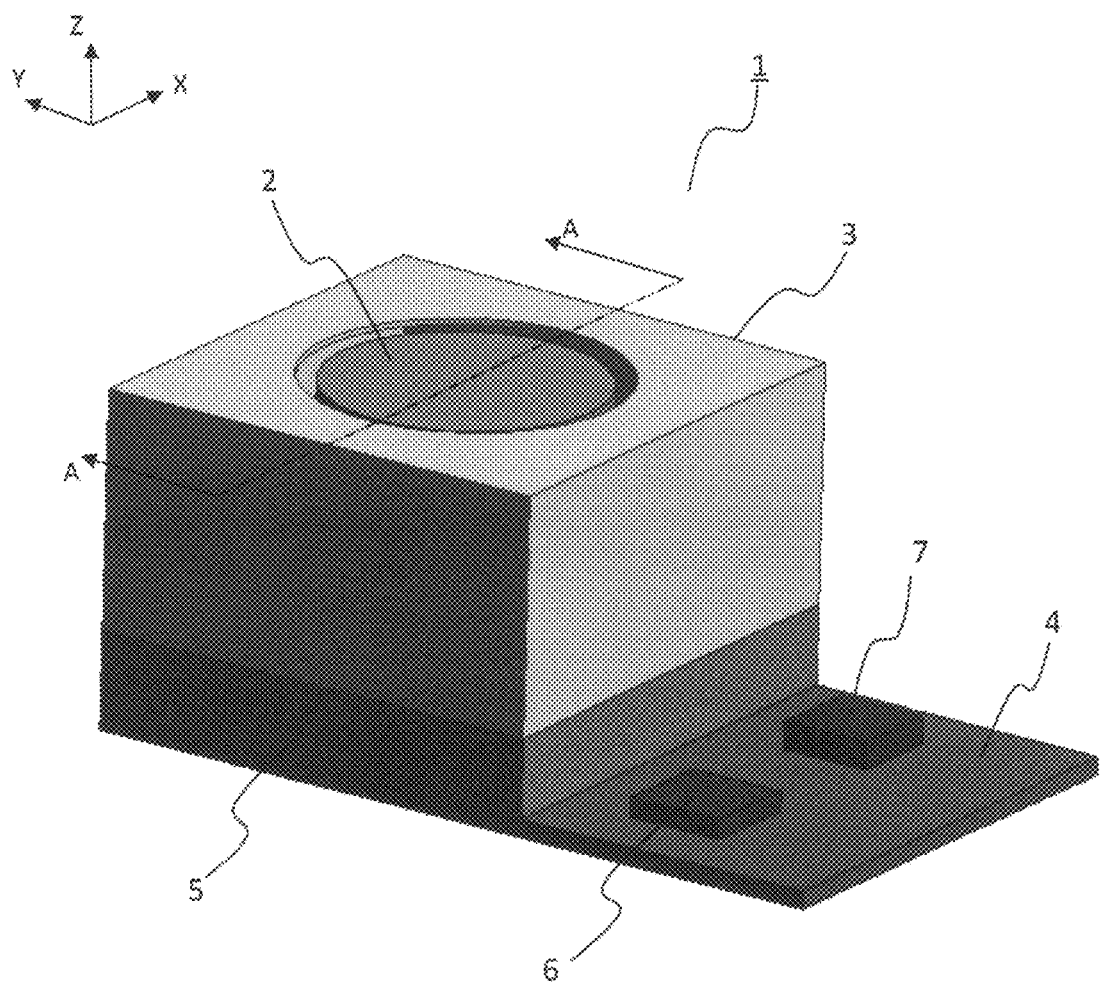
FIG. 11 is a three-dimensional diagram of a brief structure of a camera module according to an embodiment.

A camera module 1 assembled with the actuator 200 is described below. The actuator 200 is used for locating a lens. FIG. 11 shows a three-dimensional diagram of a brief structure of the camera module 1 according to an embodiment of the present invention. The camera module 1 is built in a digital camera, a digital video camera, a smartphone or a tablet terminal, and is used for photographing or video capturing. The camera module 1 described by using a module having an AF function and an OIS function as an example; however, the camera module 1 is not limited thereto, and can also be a module having only an AF function. Further, the position detection element is described as being configured for the use of OIS, but can also be configured for the use of AF. A Hall element is extensively used as the position detection element in camera modules, and thus the position detection element is described by taking a Hall element as an example; however, the position detection element is not limited thereto, and a magneto-resistive (MR) element such as a common MR element or a giant magneto-resistive (GMR) element can also be used.

The camera module 1 includes the following components: a camera lens 2; an actuator 3, for driving the camera lens 2; a module substrate 4, for mounting a camera element (to be described in FIG. 12 and FIG. 21); a sensor cover 5, covering the camera element on the module substrate 4, and carrying the actuator 3 thereon; an actuator driver 6, mounted on the module substrate 4, and driving the actuator 3; and a gyroscope sensor 7, detecting an angular speed of hand jitter. In regard to the gyroscope sensor 7, there are situation where the gyroscope sensor 7 is mounted to a main body side of a smartphone to detect hand jitter. In this case, the module substrate 4 is then not provided with the gyroscope sensor 7.

The actuator 3 drives the camera lens 2 in an optical axis direction (the Z-axis direction in the drawing) of the camera lens 2 to perform an AF operation, and drives the camera lens 2 in a direction perpendicular to the optical axis to perform image stabilization (hand jitter correction). At this point, upon detection the position of the camera lens 2 and feeding back the signal to perform position control, the camera lens can be located with high precision. In this embodiment, structural details of a position detection element used for position detection are to be described below.

The actuator driver 6 is a function integrated circuit (IC) integrated to a semiconductor substrate. The term "integrated" includes a situation where all constituting elements of a circuit are formed on a semiconductor substrate, or a situation where main structural elements of a circuit are integrated to one integral. Alternatively, a part of resistors and capacitors can be provided outside the semiconductor substrate so as to be used for adjusting circuit constants. By integrating circuits in one chip, a circuit area can be reduced and uniform characteristics of circuit elements can be maintained. The actuator driver 6 feeds back and controls a position detection signal according to a position instruction signal generated by the gyroscope sensor 7 by regarding the camera lens 2 as a specific position.

By detecting the position of the camera lens 2 and feeding back the position for position control, transient jitter in a step response can be suppressed to accelerate convergence, enhance locating precision of a target position, or maintain a predetermined position even under interference and jitter.

The configurations and influences of a coil with respect to a Hall element are described with reference to a first embodiment and a second embodiment below.

First Embodiment

Figure 12:
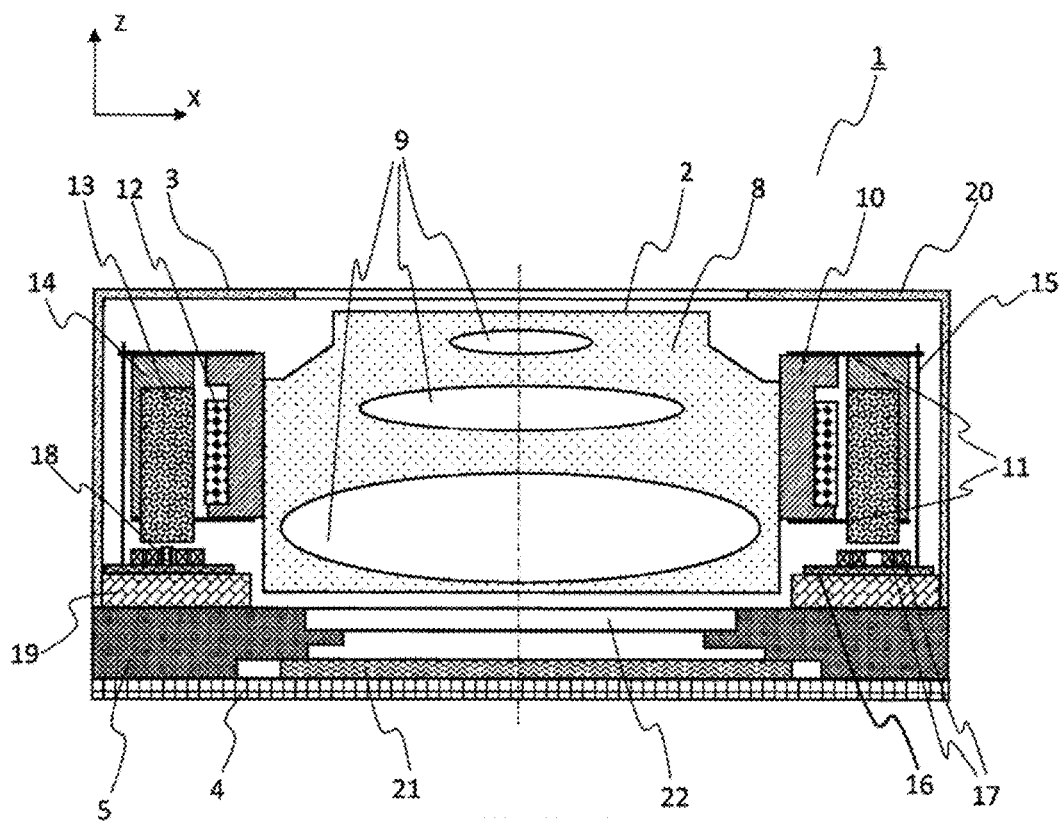
FIG. 12 is a section diagram of the camera module according to a first embodiment.

Refer to FIG. 12 to FIG. 20 for description on the first embodiment. First, FIG. 12 is used for illustrating the overall structure of a camera module. FIG. 12 shows a section diagram of a camera module according to the first embodiment, and is a section diagram of FIG. 11 along A-A.

The camera lens 2 includes a lens barrel 8 and multiple lens pieces 9. The lens pieces 9 are in a quantity of three as an example in the drawings, but can be in a larger or smaller quantity.

The actuator 3 includes a lens holder 10, an AF plate spring 11, an AF coil 12, a permanent magnet 13, a magnetic retainer 14, a suspension line 15, a flexible printed circuit (FPC) 16, an OIS coil 17, a Hall element 18, a base 19 and a cover 20. In regard to the Hall element 18, when the Hall element 18 in the drawings is configured for position detection in the X direction, other Hall elements for position detection in the Y direction are present on positions not shown.

Further, the Hall element 18 is mounted on the FPC 16 in the actuator 3 in this embodiment, but can also be mounted on the sensor cover 5 or on the module substrate 4 outside the actuator 3.

The lens holder 10 holds the camera lens 2. The lens holder 10 and the lens barrel 8 are bonded after the height of the camera lens 2 is adjusted. The AF coil 12 is wound on an outer peripheral surface of the lens holder 10. The permanent magnet 13 is fixed at the magnetic retainer 14 and opposite to the AF coil 12. An electromagnetic force (Lorentz force) acts in between the permanent magnet 13 by applying electricity to the AF coil 12, the AF coil 12 receives a force in the optical axis direction (the Z-axis direction). The lens holder 10 is supported in a movable manner in the optical axis direction relative to the magnetic retainer 14 by two upper and lower AF plate springs 11. The camera lens 2, the lens holder 10 and the AF coil 12 form an AF movable portion 30.

A part of an upper spring of the AF plate spring 11 protrudes to an exterior of the magnetic retainer 14, wherein the protruding portion is connected to an upper end of the suspension line 15, and a lower end of the suspension line 15 is connected to the FPC 16. A terminal of the AF coil 12 is connected to the FPC 16 through (the upper side of) the AF plate spring 11 and the suspension line 15. The suspension line 15 movably supports the magnetic retainer 14 in a direction perpendicular to the optical axis. The magnetic retainer 14, the permanent magnet 13 and the AF movable portion 30 form an OIS movable portion.

On the FPC 16, the OIS coil 17 is provided opposite to the permanent magnet 13. A pair of OIS coils 17 and the permanent magnetic 13 form an actuator (VCM). An electromagnetic force (Lorentz force) acts between the OIS coils 17 and the permanent magnet 13 by applying electricity to the OIS coil 17, and the OIS coil 17 receives a force in a direction (the X-axis direction) perpendicular to the optical axis. However, because the OIS coil 17 is fixed on the FPC 16, under a reaction force, the permanent magnet 13 receives a force perpendicular to the optical axis.

On the FPC 16, the Hall element 18 similarly opposite to the permanent magnet 13 is provided. The Hall element 18 accomplishes position detection by detecting a change in a magnetic flux (components in the Z-axis direction in the drawings) caused by the permanent magnet 13 moving in the X-axis direction. Details of the structure of the OIS coil and a position relationship with the Hall element are to be given in the description below. In this embodiment, the OIS coil 17 and the Hall element 18 are mounted on the same side of the FPC 16.

Further, the actuator including the OIS coil 17 for the X-axis and the permanent magnet 13 are also configured on an opposite side with the lens barrel 8 spaced in between. Thus, the camera module 1 includes OIS actuators for the Y-axis direction, but these OIS actuators are not shown. The actuator for use of the Y-axis is provided on a front side and an inner side of the paper surface. Multiple OIS-related actuators provided adopt the structure of the actuator 200 and are thus formed.

The permanent magnet 13 concurrently provides three functions—for the use of AF driving, OIS driving and OIS position detection. By using a permanent magnet for purposes of both driving and position detection, the number of parts used can be lowered.

The PFC 16 is attached on the base 19. The cover 20 is on a top surface, is provided with openings ensuring optical paths, and covers the entire actuator. The permanent magnet 13 is present on the OIS movable portion 40, and thus an ideal material of the cover 20 is a non-magnetic metal (e.g., a copper alloy such as zinc white copper).

The camera element 21 is mounted on the module substrate 4, and the sensor cover 5 is provided by means of covering the camera element 21. A hole is provided at a center of the sensor cover 5 so as to provide an infrared radiation (IR) cutoff glass 22 in form of blocking the hole. The IR cutoff glass 22 forms an IR cutoff film on a surface of a thin glass plate, such that infrared components entering the camera lens 2 are cut off and enter the camera element 21.

Figure 13:
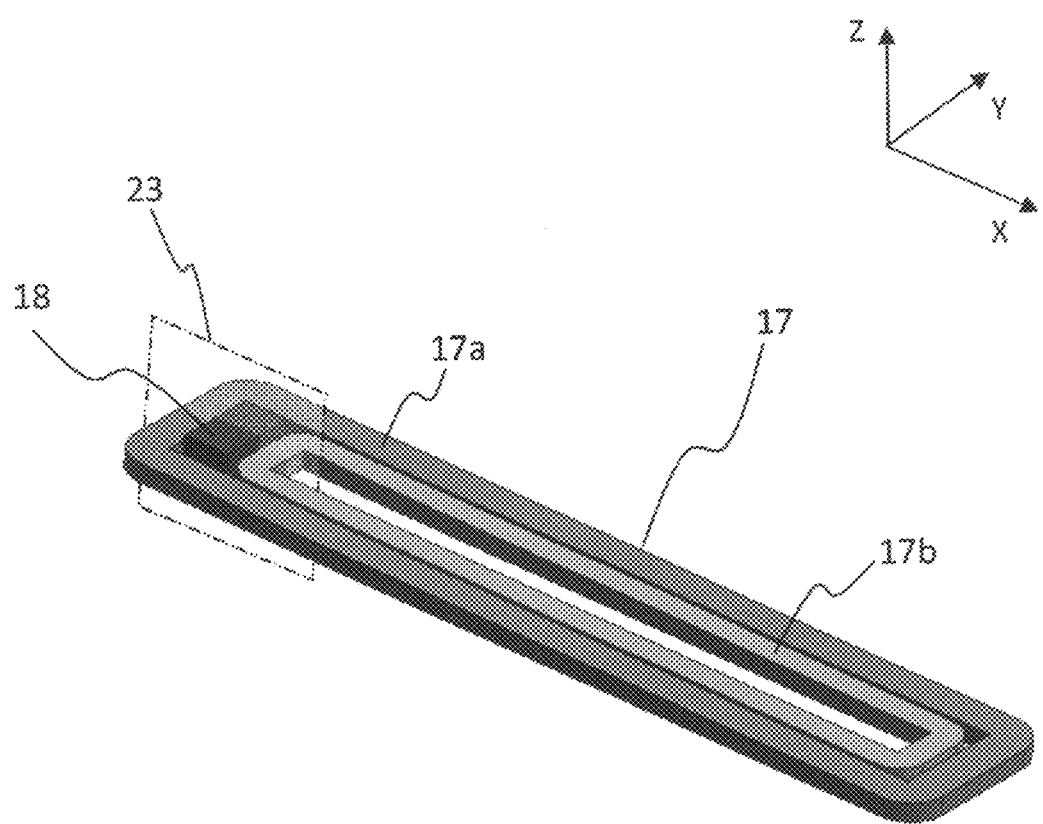
FIG. 13 is a three-dimensional diagram of a part of the camera module in FIG. 12.

The structure of the OIS coil 17 and a position relationship with the Hall element 18 are described with reference to FIG. 13 below. FIG. 13 shows a three-dimensional diagram of essential components obtained by selecting the outer coil, the inner coil and the position detection element in FIG. 12.

In this embodiment, the OIS coil 17 and the Hall element 18 are mounted on the same side of the FPC 16, and the two are thus configured with the same height. The OIS coil 17 is in a quantity of two, including an outer coil 17a and an inner coil 17b. The Hall element 18 is configured at position where a direction of a magnetic field produced by the outer coil 17a is opposite to a direction of a magnetic field produced by the inner coil 17b when a current is applied to the coils 17a and 17b. The current flows towards the same direction in a winding manner in the coils. Hence, the magnetic fields passing through the inner side of the coil winding are in the same direction, whereas magnetic fields on the outer side of the inner coil 17b return towards an opposite direction, such that the magnetic fields passing through the inner side of the outer coil 17a are in a opposite direction. By configuring the Hall element 18 at a position that renders magnetic fields to be in opposite directions, the magnetic flux density of the Hall element is decreased to reduce magnetic fog noise.

To have the magnetic flux density of the Hall element to substantially approximate zero, preferably, the directions of the magnetic fields are rendered to not only be in opposite directions but also consistent in size. The size of a magnetic field (magnetic flux density) is directly proportional to the size of the current applied and the turns of a coil. Therefore, at a position of the Hall element 18, the electric current applied to or the distribution of the turns of the outer coil 17a and the inner coil 17b are adjusted to provide the same (but in opposite directions) magnetic fields (magnetic flux densities). In a situation where the outer coil 17a and the inner coil 17b are electrically connected in series (FIG. 7B), it would be difficult to change the distribution of a current value, and thus the adjustment preferably is made on the turns in this case. In a situation where the outer coil 17a and the inner coil 17b are electrically connected in parallel (FIG. 7C), adjustment can also be made by using current values.

The change in magnetic flux densities by changing the distribution of the turns of the outer coil 17a and the inner coil 17b is explained with reference to FIG. 14 to FIG. 20.

Figure 14:
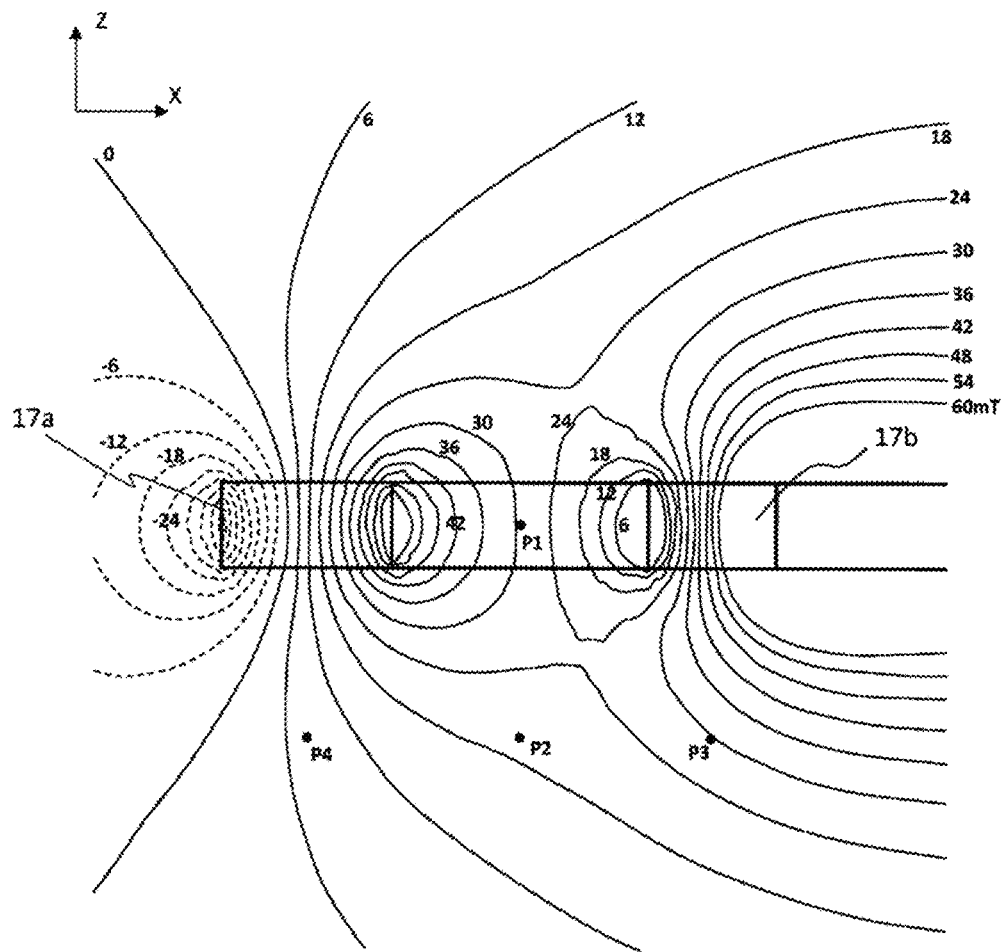
FIG. 14 is a contour plot of distribution of sizes of magnetic flux densities when a turn ratio of an outer coil of the coil structure in FIG. 13 is set to 50%.
Figure 15:
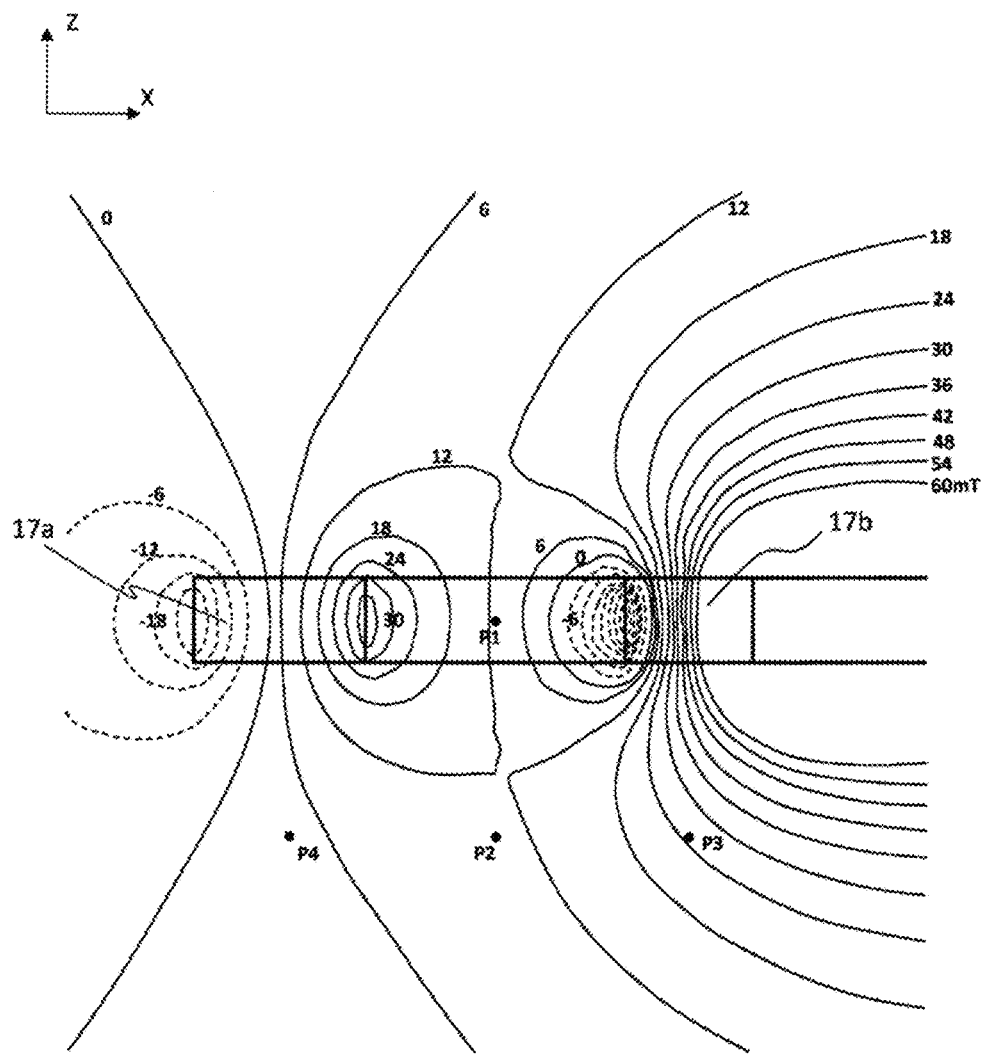
FIG. 15 is a contour plot of distribution of sizes of magnetic flux densities when a turn ratio of an outer coil of the coil structure in FIG. 13 is set to 30%.
Figure 16:
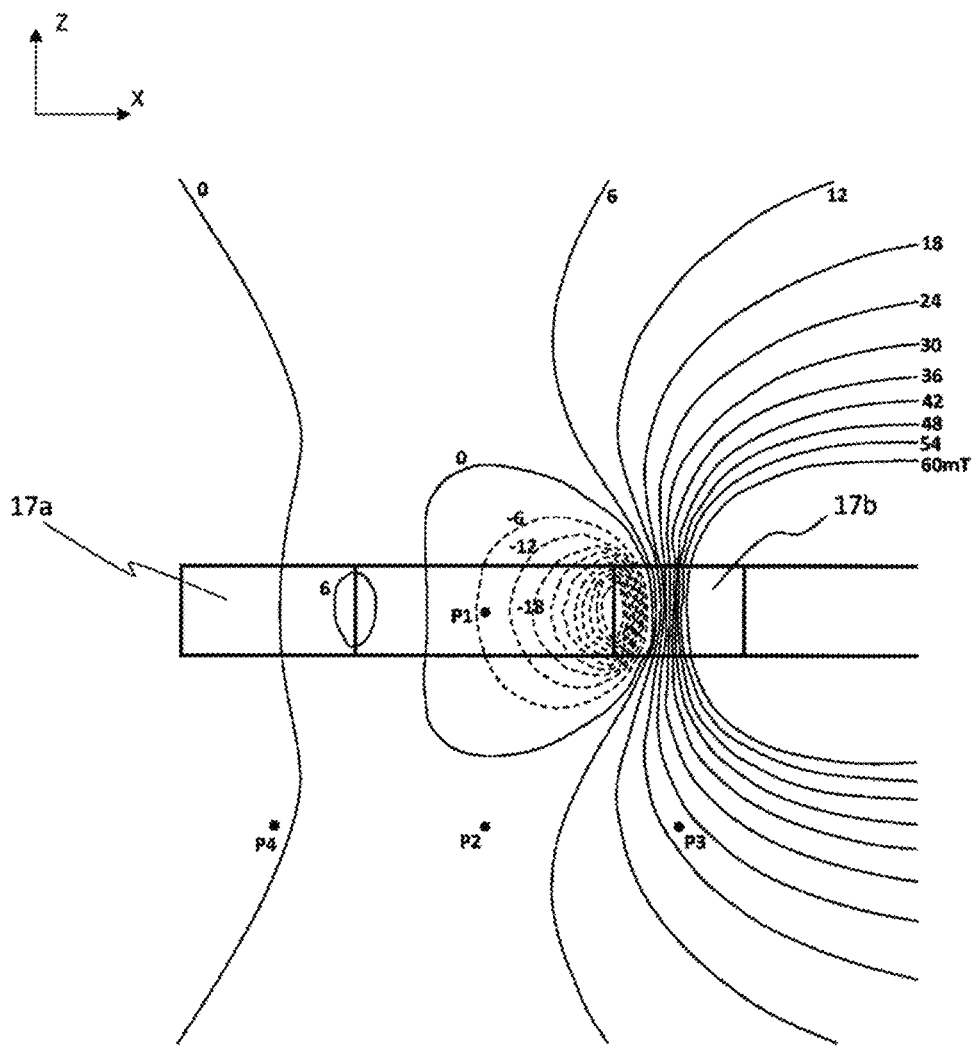
FIG. 16 is a contour plot of distribution of sizes of magnetic flux densities when a turn ratio of an outer coil of the coil structure in FIG. 13 is set to 10%.

FIG. 14 to FIG. 16 show simulation results of distribution of sizes of components of magnetic flux densities in the Z-axis direction within a region 23 enclosed by segment connecting two points in FIG. 13 when a current is individually applied to the outer coil 17a and the inner coil 17b. In FIG. 14 to FIG. 16, the distribution of turns of the outer coil 17a and the inner coil 17b varies. FIG. 14 shows a situation where the ratio of the outer coil 17a is 50%, FIG. 15 shows a situation where the ratio of the outer coil 17a is 30%, and FIG. 16 shows a situation where the ratio of the outer coil 17a is 10%. In the drawings, the curves indicate contour lines equivalent to the sizes of the magnetic flux densities in the Z-axis direction, and the sizes of the magnetic flux densities are presented by the numerals of the contour lines in a unit of millitesla (mT). Further, the dotted lines of the contour lines indicate that a magnetic field is in an opposite direction to that of solid lines. In addition, the value of the magnetic flux density is a value when 1 A current passes through the coils and a total number of turns of the two coils is 100 turns, for example.

It is known by observing the results in FIG. 14 that, under a condition where the turns of the coils are the same, i.e., 50:50, the magnetic flux density on the outer side of the coil winding is smaller compared to that on the inner side of the winding coil, a position with a balanced magnetic flux density is near an outer edge of the inner coil 17b, and a region having a pinpoint where a magnetic flux density approximates zero is present thereabout. However, due to the interference with the inner coil 17b, a Hall element cannot be configured at that position.

It is known by observing the results in FIG. 15 that, by reducing the magnetic flux density of the outer coil 17a, a region where magnetic flux densities are counteracted and approximate zero is shifted towards the left. Further, a region having a smaller magnetic flux density is also enlarged in a thickness direction of the coils.

It is known by observing the results in FIG. 16 that, when the turn ratio of the outer coil 17a is 10%, a region where magnetic flux densities are counteracted and approximate zero is shifted further towards the left, and a region having a smaller magnetic flux density is also further enlarged in the thickness direction of the coils.

As such, reaching a balance in the sizes of the magnetic flux densities of the outer coil 17a and the inner coil 17b by using the turns of coils can control a position in a region where the magnetic flux densities approximate zero, and can allow a position configured with a Hall element to be limited to a certain degree by the structure of a camera module. Therefore, after the position of the Hall element is determined, the distribution of turns of coils is set by decreasing the magnetic flux densities at that position.

In FIG. 14 to FIG. 16, P1 to P4 represent predetermined monitoring points. P1 is a position at the center of a coil thickness and an exact middle point between an inner edge of the outer coil 17a and an outer edge of the inner oil 17b. P2 is a position in the middle of the inner edge and the outer edge as P1, and spaced by a fixed distance in the thickness direction of the coils. A second embodiment is described below, in which when a rear side of the FPC 16 is configured with a Hall element, the magnetic detection portion of the Hall element is at a position spaced by a fixed distance in the thickness direction of the coils, as described. P3 and P4 are positions spaced from P2 by the same distance in the thickness direction and shifted to the left and right. P3 is a middle position between the outer edge and the inner edge of the inner coil 17b, and P4 is a middle position between the outer edge and the inner edge of the outer coil 17a.

Figure 17:
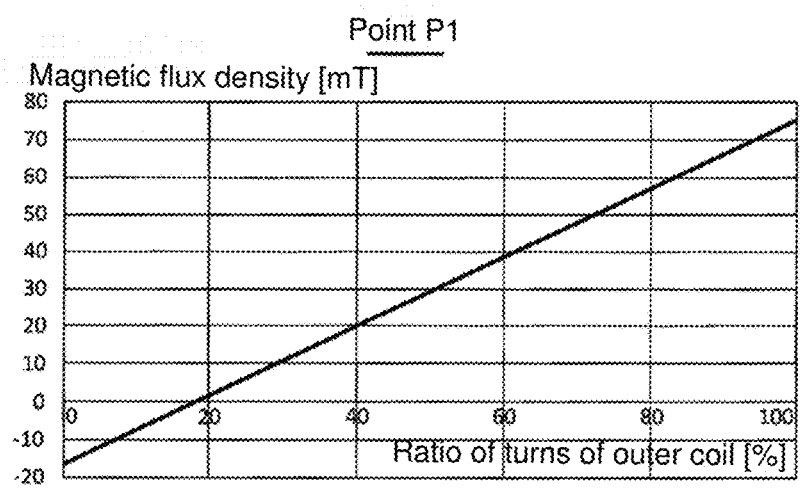
FIG. 17 is a diagram of a relationship between a magnetic flux density at a point P1 and a turn ratio of an inner coil to an outer coil.

FIG. 17 shows a diagram of a relationship between a turn ratio and a magnetic flux density at the point P1. According to a position of a magnetic detection portion in a package, it is possible that the position is somewhat shifted in the thickness direction of the coil. According to the results in FIG. 17, along with the increase in the ratio of turns of the outer coil, the magnetic flux density is increased, and the magnetic flux density becomes zero when the ratio is 18%.

Figure 18:
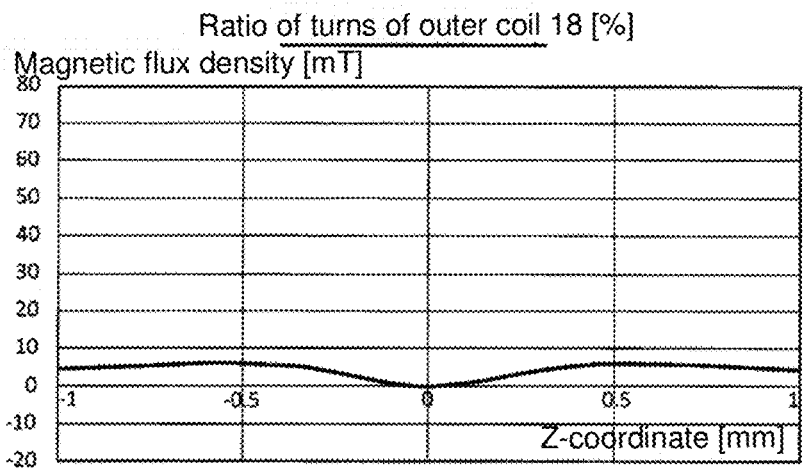
FIG. 18 is a diagram of a change in a magnetic flux density on a segment connecting points P1 and P2 when a turn ratio of an outer coil is 18%.

As previously described, a position of a detection portion in a package of a Hall element can slightly differ according to specifications, and thus the magnetic flux density distribution in the thickness direction (the Z-axis direction) of the coil is also determined. An optimal condition of the ratio of turns of the outer coil obtained according to FIG. 17 is 18%. FIG. 18 is a diagram showing the change in magnetic flux densities on a segment connecting the points P1 and P2 when the turn ratio of the outer coil is 18%. 0 of the horizontal axis is the position of P1. It is known from the results that, at the position of P1, the magnetic flux density is naturally zero. Thus, even if a position is shifted in the Z-axis direction, the change in the magnetic flux density is also smaller, such that a region, rather than a pinpoint, capable of decreasing magnetic fog noise is significantly enlarged.

Figure 19:
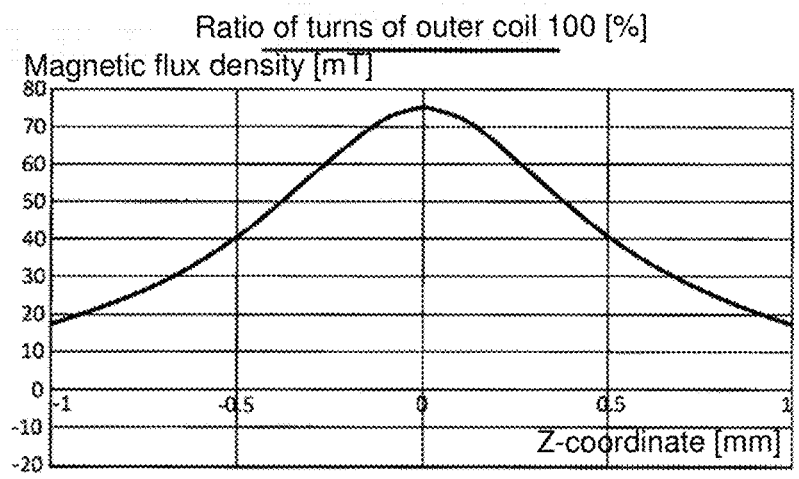
FIG. 19 is a diagram of a change in a magnetic flux density on a segment connecting points P1 and P2 when a turn ratio of an outer coil is 100%.
Figure 20:
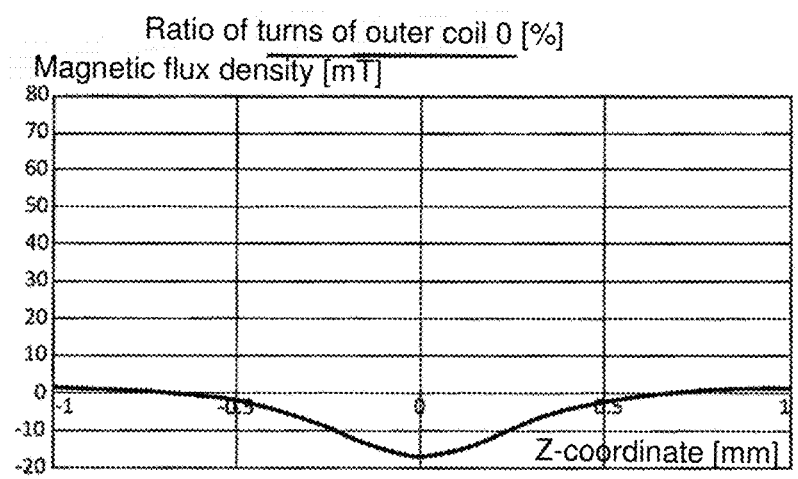
FIG. 20 is a diagram of a change in a magnetic flux density on a segment connecting points P1 and P2 when a turn ratio of an outer coil is 0%.

FIG. 19 is a diagram showing the change in magnetic flux densities on a segment connecting the points P1 and P2 when the turn ratio of the outer coil is 100%, which is equivalent to an embodiment below; that is, a Hall element is present on an inner side of the coil winding as in FIG. 11A. FIG. 20 is a diagram showing the change in magnetic flux densities on a segment connecting the points P1 and P2 when the turn ratio of the outer coil is 0%, which is equivalent to an embodiment below; that is, a Hall element is present on an outer side of the coil winding as in FIG. 11B. A horizontal axis and a vertical axis in FIG. 19 and FIG. 20 are used in a same manner in FIG. 18.

It is known from FIG. 19 and FIG. 20 that, a position of P1 (the position where the horizontal axis is 0) also becomes a region in which the magnetic flux density is quite large. In an existing example where one single coil is adjacently configured to a Hall element, the influence of magnetic fog noise cannot be overlooked.

Further, the two coils can also be configured as a combination of coils formed by respectively winding wires. However, the in the above structure, the alignment between an outer coil and an inner coil can be complex, and so the assembly of using a patterned coil is easier. In a patterned coil, a coil-shaped pattern is formed by means of etching. Thus, in a dual structure manufactured by patterning, the alignment between an outer coil and an inner coil during mounting to the FPC 16 is not required.

Second Embodiment

Figure 21:
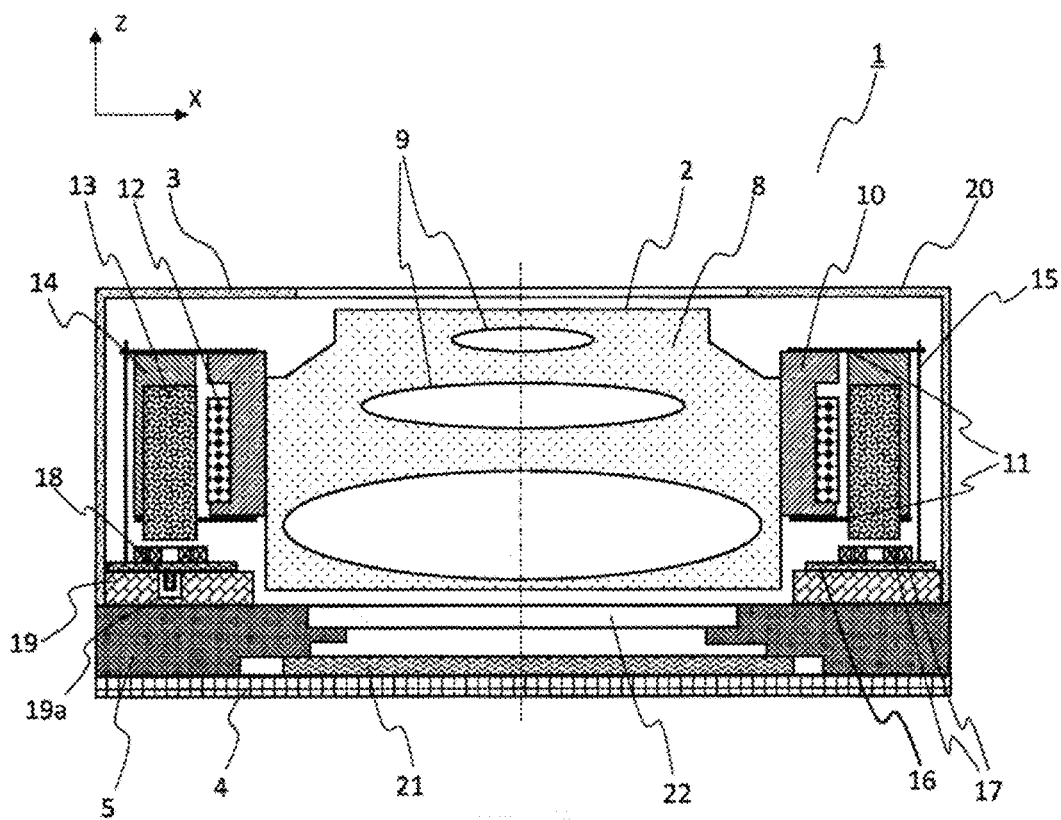
FIG. 21 is a section diagram of a camera module according to a second embodiment.

A second embodiment is described with reference to FIG. 21 to FIG. 26. FIG. 21 shows a section diagram of a camera module according to the second embodiment, and is a section diagram of FIG. 11 along A-A.

The overall structure of the camera module is first described with reference to FIG. 21. Because a large part of the camera module is the same as that of the camera module in FIG. 12, and associated details are omitted herein. The camera module in FIG. 21 differs from the camera module in FIG. 12 in that, the OIS coil 17 and the Hall element 18 are mounted on a surface of an opposite side of the FPC 16. As described above, in this embodiment, the OIS coil 17 and the Hall element 18 are mounted on an opposite side of the FPC 16, and so the two are configured by a certain space in the thickness direction of the coil. In order to allow the Hall element 18 mounted on the rear side of the FPC 16 to retreat, an etching hole 19a is provided on the base 19.

Figure 22:
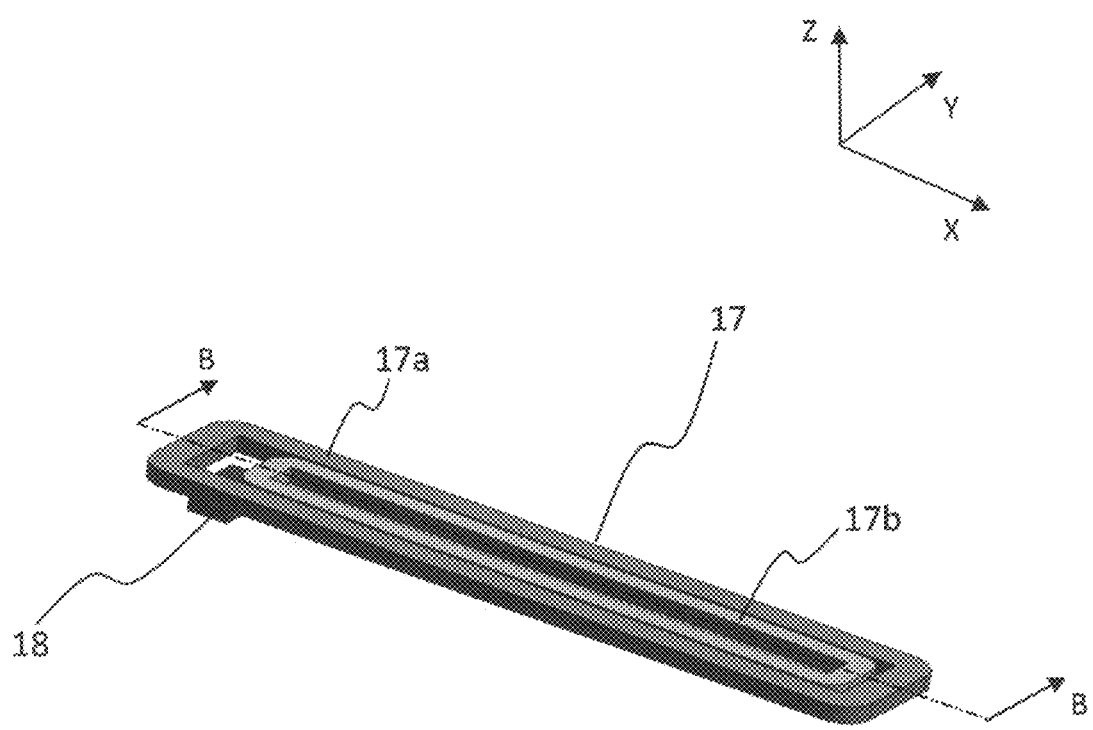
FIG. 22 is a three-dimensional diagram of a part of the camera module in FIG. 21.

The structure of the OIS coil 17 and a relationship with the Hall element 18 are described with reference to FIG. 22. FIG. 22 is a three-dimensional diagram of essential elements obtained by selecting the outer coil, the inner coil and the position detection element in FIG. 21.

The OIS coil 17 in similarly formed in a quantity of two as the first embodiment, and includes an outer coil 17a and an inner coil 17b. Details in the following are also the same; that is, the Hall element 18 is configured at a position that renders a direction of a magnetic field produced by the outer coil 17a to be opposite to a direction of a magnetic field produced by the inner coil 17b when a current is applied to the coils 17a and 17b. The Hall element 18 is configured at a position shifted in the thickness direction (the Z-axis) of the coil. By configuring the Hall element 18 at a position rendering the magnetic fields to be in opposite directions, the magnetic flux density passing through the Hall element is decreased, thus reducing magnetic fog noise. The following is the same as that in the first embodiment; that is, the distribution of a current or the number of turns of the outer coil 17a and the inner coil 17b is adjusted, such that the magnetic flux density passing through the Hall element substantially approximates zero.

In this embodiment, the Hall element 18 is mounted on a rear side of the FPC 16, in a way that the positions in the X direction and the Y direction of Hall element 18 can be freely set to a certain degree without interference of the OIS coils 17. A configuration example of the Hall element 18 is given below.

Figure 23A:
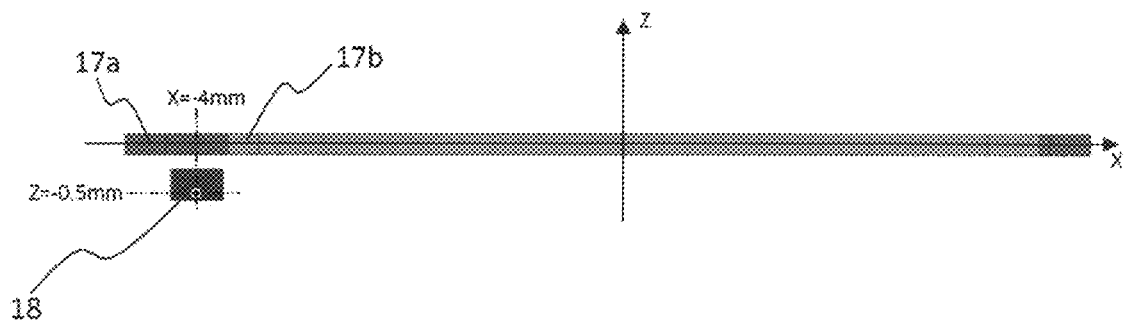
FIG. 23A to FIG. 23C are diagrams of configuration examples of a Hall element.
Figure 23B:
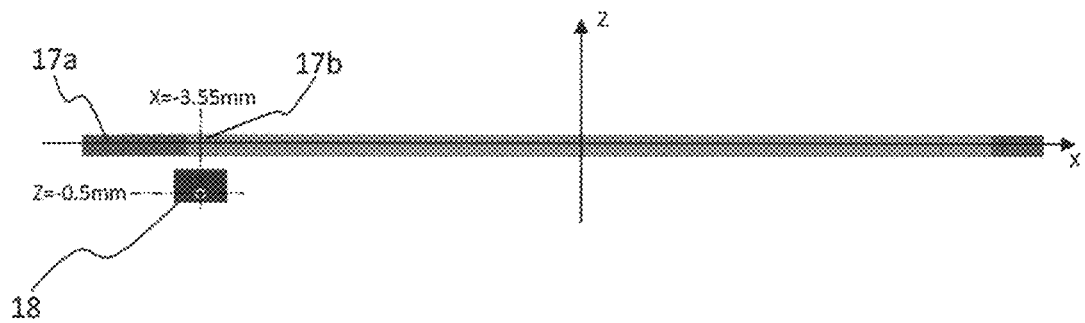
Figure 23C:
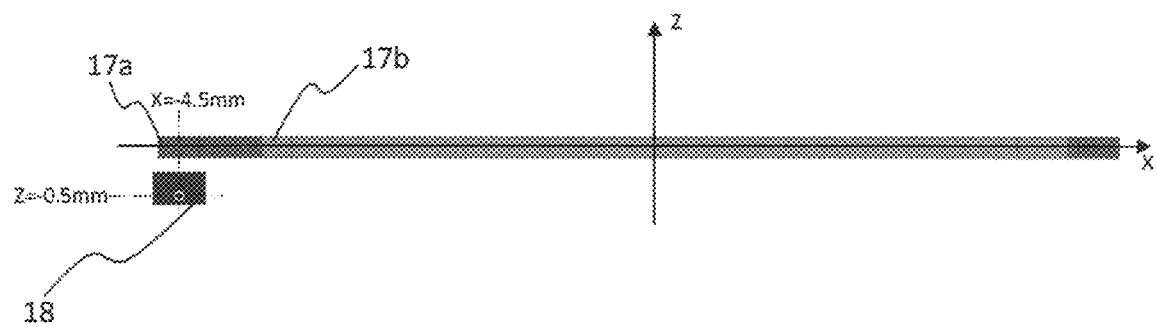

FIG. 23A to FIG. 23C are diagram of configuration examples of a Hall element, and represent section diagrams of FIG. 22 along B-B. FIG. 23A is equivalent to the position of P2 in FIG. 14 to FIG. 16—the Hall element 18 is configured at a middle position of a gap between the outer coil 17a and the inner coil 17b.

FIG. 23B is equivalent to the position of P3 in FIG. 14 to FIG. 16—the Hall element is configured at a middle position between an outer edge and an inner edge of the inner coil 17b. If the Hall element 18 is configured to be closer to the inner side than the position, then a magnetic field from the outer coil 17a and a magnetic field from the inner coil 17b both become being in the same direction, and are mutually reinforced rather than mutually counteracted. Thus, the position serves as a meaningful defining position for a dual coil structure.

FIG. 23C is equivalent to the position of P4 in FIG. 14 to FIG. 16—the Hall element 18 is configured at a middle position between the outer edge and the inner edge of the outer coil 17a. If the Hall element 18 is configured closer to the outer side than the position, then a magnetic field from the outer coil 17a and a magnetic field from the inner coil 17b both become being in the same direction, and are mutually reinforced rather than mutually counteracted. Thus, the position serves as a meaningful defining position for a dual coil structure.

Figure 24:
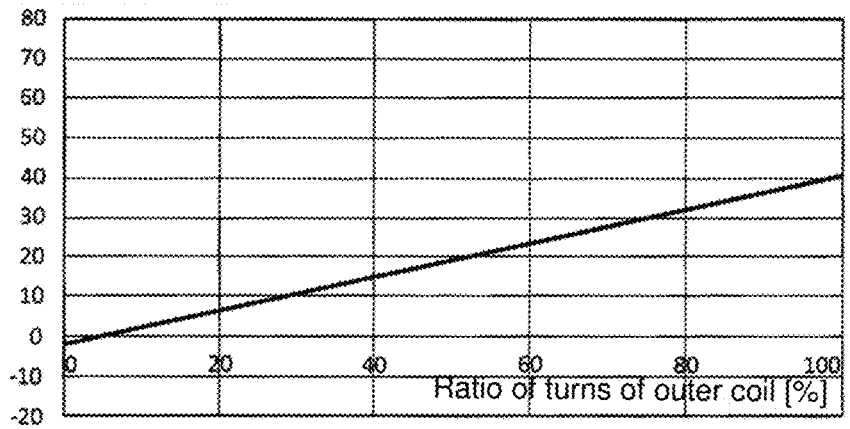
FIG. 24 is a diagram of a relationship between a magnetic flux density at a point P2 in FIG. 14 to FIG. 16 and a turn ratio of an inner coil to an outer coil.

The relationship between the turn ratio and a magnetic flux density at the position of the point P2 is described below. FIG. 24 shows a diagram of a relationship between the magnetic flux density at point P2 in FIG. 14 to FIG. 16 and the turn ratio of the inner coil to the outer coil. According to the results in FIG. 24, the magnetic flux density increases as the turn ratio of the outer coil increases, and the magnetic flux density becomes zero when the ratio is 4%.

Figure 25:
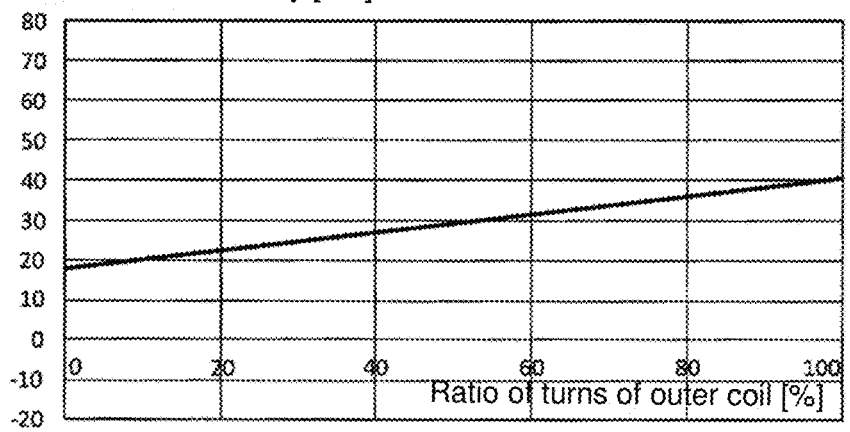
FIG. 25 is a diagram of a relationship between a magnetic flux density at a point P3 in FIG. 14 to FIG. 16 and a turn ratio of an inner coil to an outer coil.

FIG. 25 shows a diagram of a relationship between the magnetic flux density at point P3 in FIG. 14 to FIG. 16 and the turn ratio of the inner coil to the outer coil. According to the results in FIG. 25, even if the turn ratio is changed, the magnetic flux density does not become zero. In a situation where a Hall element needs to be configured at that position, an ideal approach is to decrease the turn ratio of the outer coil (to zero eventually).

Figure 26:
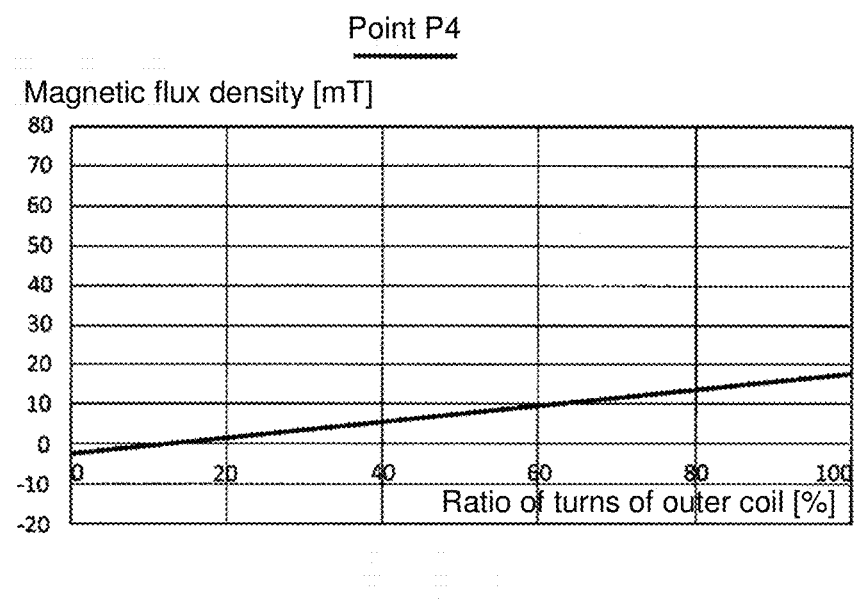
FIG. 26 is a diagram of a relationship between a magnetic flux density at a point P4 in FIG. 14 to FIG. 16 and a turn ratio of an inner coil to an outer coil.

The relationship between the turn ratio and a magnetic flux density at the position of the point P4 is described below. FIG. 26 shows a relationship between the magnetic flux density at the point P4 in FIG. 14 to FIG. 16 and the turn ratio of the inner coil to that of the outer coil. According to the results in FIG. 26, the magnetic flux density increases as the turn ratio of the outer coil increases, and the magnetic flux density becomes zero when the ratio is 12%.

Further, as in the second embodiment, compared to a situation where a Hall element is configured on an obverse side, in a situation where a Hall element is configured at a rear side of the FPC 16, the distance of the Hall element from the permanent magnetic become larger, and the original position detection sensitivity for a signal is lowered. However, the distance from the coil also becomes larger, and so magnetic fog noise can also be easily reduced. Any one of the structure in the first embodiment and the structure in the second embodiment can be selected according to the overall performance of signal-to-noise ratio (SNR), or the relationship of the configuration gap between the coil and the Hall element. In addition, the options are not limited to the examples above, and a Hall element can also be configured on the sensor cover or on the module substrate.

The camera module described above is applied to a mobile device such as a smartphone. Particularly, the camera module of the present invention is preferably applied to a device that has an optical image stabilization (OIS) function and an automatic focusing (AF) function and is capable of performing feedback control by using a position detection signal of a movable portion. The following camera module can be achieved by using the present invention—a camera module capable of reducing magnetic fog noise generated from applying electricity to coils, achieving high-precision lens position control, and enhancing OIS correction precision or shortening the capturing time of AF.

In regard to the camera module 1, a moving coil type is illustrated when serving as an AF actuator, and a moving magnetic type is illustrated when serving as an OIS actuator; however, the camera module 1 is not limited to the above examples. Alternatively, an AF actuator can also be formed by a moving magnet type, and an OIS actuator can be formed by a moving coil type. In FIG. 12, the coil plane of the OIS coils 17 is, for example but not limited to, perpendicular to the Z-axis; however, other layouts shown in FIG. 8 of patent document 1 can also be adopted.

What is claimed is:

1. An actuator used jointly with a position detection element for locating a lens in a direction of a first axis, and comprising:
   a coil, formed in a manner of setting a second axis perpendicular to the first axis as a length direction, having a first side and a second side parallel to the second axis and a third side and a fourth side parallel to the first axis; and
   a permanent magnet, producing magnetic fields respectively perpendicular to the first axis and the second axis and in opposite directions with respect to the first side and the second side,
   wherein, during use, the position detection element is configured near the third side, and the coil is split into multiple parts in a width direction on at least the third side,
   wherein a width of the third side is greater than a width of the fourth side.

2. The actuator according to claim 1, wherein
   the multiple parts comprise a first part and a second part; and
   when the actuator is projected onto a plane formed by the first axis and the second axis, a magnetic detection portion of the position detection element is located between the first part and the second part in a direction of the second axis.

3. The actuator according to claim 1, wherein quantities of windings or coil patterns respectively comprised in the multiple parts are different.

4. The actuator according to claim 3, wherein the quantities of the windings or the coil patterns respectively comprised in the multiple parts decrease as the windings or the coil patterns get closer to an outer side.

5. The actuator according to claim 1, wherein the coil is split into multiple parts from the first side to the fourth side, respectively.

6. The actuator according to claim 5, wherein the multiple parts are electrically connected in series.

7. The actuator according to claim 5, wherein the coil forms independent electric currents that can be individually provided to the multiple parts.

8. The actuator according to claim 1, wherein the coil is a patterned coil.

9. The actuator according to claim 1, wherein the coil is a winding coil.

10. A camera module comprising the actuator according to claim 1.

11. An actuator used jointly with a position detection element for locating a lens in a direction of a first axis, and comprising:
    a coil, formed in a manner of setting a second axis perpendicular to the first axis as a length direction, having a first side and a second side parallel to the second axis and a third side and a fourth side parallel to the first axis; and a permanent magnet, producing magnetic fields respectively perpendicular to the first axis and the second axis and in opposite directions with respect to the first side and the second side, wherein, during use, the position detection element is configured near the third side;

distribution, in a direction of the second axis, of a winding or a coil pattern on the third side is designed according to a position of the position detection element, the position rendering a combined magnetic field to be decreased, a width of the third side is greater than a width of the fourth side.

12. A camera module comprising the actuator according to claim 11.

13. A camera module comprising:
a camera lens, capable of obtaining support by means of moving towards a predetermined direction;
an actuator, comprising a coil and a permanent magnet, for locating the camera lens; and
a position detection element, for magnetically detecting a position of the camera lens,
wherein, the coil is formed as a dual structure of two coils comprising an inner coil and an outer coil.

14. The camera module according to claim 13, wherein the coil is configured near the position detection element; observing from a winding axis direction of the coil, a center of a magnetic detection portion of the position detection element is between a middle position of an inner edge and an outer edge of the inner coil and a middle position of an inner edge and an outer edge of the outer coil.

15. The camera module according to claim 14, wherein a turn ratio of the inner coil to the outer coil is determined correspondingly according to a position of the position detection element.

16. The camera module according to claim 15, wherein a quantity of turns of the outer coil is configured to be less compared to that of the inner coil.

17. The camera module according to claim 14, wherein when the inner coil and the outer coil are connected in parallel, a ratio of a current value to be supplied to the inner coil to a current value to be supplied to the outer coil is correspondingly determined according to a position of the position detection element.

18. The camera module according to claim 17, wherein the current value to be supplied to the outer coil is configured to be smaller compared to that to be supplied to the inner coil.

19. The camera module according to claim 13, wherein the coil is a patterned coil.

20. The camera module according to claim 13, wherein the coil is configured opposite to the permanent magnetic, the position detection element is configured opposite to the permanent magnet, and the permanent magnet serves both for driving and position detection.

21. The camera module according to claim 13, wherein a position detection signal generated by the position detection element is used to control a position of the camera lens by means of feedback control.

* * * * *